United States Patent
Liu et al.

(10) Patent No.: US 10,854,928 B2
(45) Date of Patent: Dec. 1, 2020

(54) ELECTROLYTE AND BATTERY

(71) Applicants: POSITEC POWER TOOLS (SUZHOU) CO., LTD., Suzhou (CN); Pu Chen, Waterloo (CA)

(72) Inventors: Yang Liu, Waterloo (CA); Pu Chen, Waterloo (CA); Jing Yan, Waterloo (CA)

(73) Assignees: POSITEC POWER TOOLS (SUZHOU) CO., LTD., Suzhou (CN); Pu Chen, Waterloo (CA)

(*) Notice: Subject to any disclaimer, the term of this patent is extended or adjusted under 35 U.S.C. 154(b) by 0 days.

(21) Appl. No.: 16/534,555

(22) Filed: Aug. 7, 2019

(65) Prior Publication Data
US 2019/0363403 A1 Nov. 28, 2019

Related U.S. Application Data

(63) Continuation of application No. 15/783,460, filed on Oct. 13, 2017, now Pat. No. 10,418,666, which is a (Continued)

(30) Foreign Application Priority Data

Jun. 28, 2013 (CN) .......................... 2013 1 0268836
Jun. 28, 2013 (CN) .......................... 2013 1 0269723
(Continued)

(51) Int. Cl.
*H01M 10/36* (2010.01)
*H01M 10/38* (2006.01)
(Continued)

(52) U.S. Cl.
CPC ........... *H01M 10/36* (2013.01); *H01M 4/366* (2013.01); *H01M 4/42* (2013.01); *H01M 4/505* (2013.01);
(Continued)

(58) Field of Classification Search
None
See application file for complete search history.

(56) References Cited

U.S. PATENT DOCUMENTS 4,492,021 A   1/1985   Wright et al.
5,721,068 A   2/1998   West et al.
(Continued)

FOREIGN PATENT DOCUMENTS

CN       1770515 A      5/2006
CN    101465421 A      6/2009
(Continued)

OTHER PUBLICATIONS

English language abstract and computer-generated English language translation for CN102035007 extracted from espacenet.com database on Jan. 31, 2016; 11 pages.
(Continued)

*Primary Examiner* — Wyatt P McConnell
(74) *Attorney, Agent, or Firm* — Howard & Howard Attorneys PLLC

(57) ABSTRACT

A battery comprises a cathode, an anode and an electrolyte. The cathode comprises a cathode active material which is capable of reversibly intercalating and deintercalating a plurality of first metal ions; and a conductive agent, wherein the particle size of the conductive agent graphite is less than 50 μm and the crystallinity of the conductive agent graphite is no less than 90%.

14 Claims, 11 Drawing Sheets

Related U.S. Application Data continuation of application No. 14/980,257, filed on Dec. 28, 2015, now Pat. No. 9,812,738, which is a continuation of application No. PCT/CN2014/081029, filed on Jun. 27, 2014.

(30) Foreign Application Priority Data

| | | |
|---|---|---|
| Jul. 12, 2013 | (CN) | 2013 1 0293434 |
| Jul. 12, 2013 | (CN) | 2013 1 0293478 |
| Jul. 15, 2013 | (CN) | 2013 1 0296251 |
| Aug. 9, 2013 | (CN) | 2013 1 0346594 |
| Dec. 20, 2013 | (CN) | 2013 1 0713128 |
| Dec. 23, 2013 | (CN) | 2013 1 0717178 |
| Jan. 2, 2014 | (CN) | 2014 1 0001781 |

(51) Int. Cl.

| | |
|---|---|
| *H01M 4/42* | (2006.01) |
| *H01M 4/505* | (2010.01) |
| *H01M 4/62* | (2006.01) |
| *H01M 4/66* | (2006.01) |
| *H01M 4/36* | (2006.01) |
| *H01M 4/02* | (2006.01) |

(52) U.S. Cl.

CPC ............ *H01M 4/62* (2013.01); *H01M 4/623* (2013.01); *H01M 4/625* (2013.01); *H01M 4/661* (2013.01); *H01M 4/663* (2013.01); *H01M 4/667* (2013.01); *H01M 10/38* (2013.01); *H01M 2004/027* (2013.01); *H01M 2004/028* (2013.01); *H01M 2004/029* (2013.01); *H01M 2220/20* (2013.01); *H01M 2300/0002* (2013.01); *H01M 2300/0005* (2013.01)

(56) References Cited

U.S. PATENT DOCUMENTS

| | | |
|---|---|---|
| 8,703,330 B2 | 4/2014 | Phillips et al. |
| 9,680,154 B2 | 6/2017 | Chen et al. |
| 9,812,738 B2 | 11/2017 | Liu et al. |
| 2003/0099882 A1 | 5/2003 | Hampden-Smith et al. |
| 2003/0215716 A1 | 11/2003 | Suzuki et al. |
| 2006/0063065 A1 | 3/2006 | Clarke et al. |
| 2006/0088759 A1 | 4/2006 | Roh |
| 2007/0037060 A1 | 2/2007 | Lee et al. |
| 2008/0163478 A1 | 7/2008 | Phillips et al. |
| 2009/0057940 A1 | 3/2009 | Zhamu et al. |
| 2009/0123850 A1* | 5/2009 | Takeuchi ............ H01M 4/0433 429/342 |
| 2009/0220860 A1* | 9/2009 | Xi .................... C01G 30/00 429/220 |
| 2010/0062338 A1 | 3/2010 | Golightly et al. |
| 2010/0266895 A1 | 10/2010 | Tucholski |
| 2010/0304274 A1 | 12/2010 | Bennett et al. |
| 2011/0159381 A1 | 6/2011 | Doe et al. |
| 2011/0171534 A1 | 7/2011 | Lampert et al. |
| 2011/0223470 A1 | 9/2011 | Tomantschger |
| 2013/0089769 A1 | 4/2013 | Proctor et al. |
| 2013/0171523 A1* | 7/2013 | Chen .................... H01B 1/08 429/221 |
| 2014/0272480 A1 | 9/2014 | Schuetzbach et al. |
| 2014/0272605 A1 | 9/2014 | Lim et al. |
| 2015/0311516 A1 | 10/2015 | Chen et al. |
| 2016/0056417 A1 | 2/2016 | Flitsch et al. |
| 2017/0309912 A1 | 10/2017 | Chen et al. |
| 2018/0040919 A1 | 2/2018 | Liu et al. |

FOREIGN PATENT DOCUMENTS

| | | |
|---|---|---|
| CN | 102035007 A | 4/2011 |
| CN | 102110839 A | 6/2011 |
| CN | 101208818 A | 11/2012 |
| CN | 102856557 A | 1/2013 |
| CN | 103022472 A | 4/2013 |
| CN | 103030171 A | 4/2013 |
| CN | 103531769 A | 1/2014 |
| CN | 103682476 A | 3/2014 |
| CN | 102856557 B | 10/2014 |
| CN | 103107373 A | 9/2015 |
| EP | 2717377 A1 | 4/2014 |
| WO | 2006116496 A2 | 11/2006 |
| WO | 2012163300 A1 | 12/2012 |
| WO | 2016011393 A1 | 1/2016 |

OTHER PUBLICATIONS

English language abstract and computer-generated English language translation for CN102856557 extracted from espacenet.com database on Jan. 31, 2016, 15 pages.

English language abstract and computer-generated English language translation for CN103107373 extracted from espacenet.com database on Jan. 31, 2016; 25 pages.

English language abstract and computer-generated English translation for CN102110839 extracted from espacenet.com database on Jan. 31, 2016, 18 pages.

English language abstract and computer-generated translation of CN101465421 extracted from espacenet.com database Mar. 21, 2017, 9 pages.

English language abstract and computer-generated translation of CN103022472 extracted from espacenet.com database Mar. 21, 2017, 8 pages.

English language abstract and computer-generated translation of CN103030171 extracted from espacenet.com database Mar. 21, 2017, 6 pages.

English language abstract and computer-generated translation of CN103531769 extracted from espacenet.com database Mar. 21, 2017, 4 pages.

English language abstract and computer-generated translation of CN103682476 extracted from espacenet.com database Mar. 21, 2017, 33 pages.

English language abstract and computer-generated translation of CN1770515A extracted from espacenet.com Feb. 27, 2019, 8 pages.

English language abstract for CN101208818 extracted from espacenet.com database on Jan. 31, 2016; 2 pages.

English language abstract only of International Patent Application Publication No. WO 2012/163300 extracted from www.espacenet.com on Mar. 5, 2019; see English language equivalent U.S. Pat. No. 9,680,154 B2; 2 pages.

English language abstract, and machine-assisted English language translation of Chinese Patent Publication No. CN 102856557 A extracted from www.espacenet.com on Mar. 5, 2019; 9 pages.

English language translation of the International Search Report for PCT/CN20151090769, dated Dec. 9, 2015.

International Search Report for International Patent Application No. PCT/CN2014/081029, dated Sep. 2, 2014; 4 pages.

Supplementary European Search Report for European Patent Application No. EP 15 84 3519, dated Feb. 20, 2018; 8 pages.

\* cited by examiner

ELECTROLYTE AND BATTERY

CROSS-REFERENCE TO RELATED APPLICATIONS

This application is a continuation of U.S. patent application Ser. No. 15/783,460 filed on Oct. 13, 2017, now issued U.S. Pat. No. 10,418,666, which is a continuation of U.S. patent application Ser. No. 14/980,257 filed on Dec. 28, 2015, now issued U.S. Pat. No. 9,812,738, which is a continuation of International Application No. PCT/CN2014/081029 filed on Jun. 27, 2014, which claims priority to Chinese Application No. CN201310268836.5 filed on Jun. 28, 2013, Chinese Application No. CN201310269723.7 filed on Jun. 28, 2013, Chinese Application No. CN201310293434.0 filed on Jul. 12, 2013, Chinese Application No. CN201310293478.3 filed on Jul. 12, 2013, Chinese Application No. CN201310296251.4 filed on Jul. 15, 2013, Chinese Application No. CN201310346594.7 filed on Aug. 9, 2013, Chinese Application No. CN201310713128.8 filed on Dec. 20, 2013, Chinese Application No. CN201310717178.3 filed on Dec. 23, 2013, and Chinese Application No. CN201410001781.6 filed on Jan. 2, 2014, the contents of which are incorporated by reference herein.

FIELD OF THE INVENTION

The present invention relates to a battery.

BACKGROUND OF THE INVENTION

Lead-acid batteries, which exist over hundred years and have a mature technology, have accumulated dominant market share in car starting batteries, electric bicycles, UPS and other energy storage areas. Although the cycle life and the energy density are relatively low, lead-acid batteries characterize high cost effectiveness. Thus, in recent years lead-acid batteries cannot be replaced by nickel-metal hydride batteries, lithium ion batteries and sodium sulfur batteries in energy storage area.

A new ion exchange battery comprises a cathode, an anode and en electrolyte, the working principle could be summarized as follows: during the charging process, the first metal ions deintercalate from the cathode, while simultaneously, the second metal ions in the electrolyte are reduced and deposited onto the surface of the anode. Theoretical energy density of the ion exchange battery is 160 Wh/Kg, and the actual energy density is expected to reach 50~80 Wh/Kg. Therefore this type of battery could be a promising alternative of lead-acid batteries in next generation storage batteries.

However, the electrolytes used in the ion exchange battery are acetate, hydrochloride, and sulfate. Acetate could be easily oxidized due to its poor stability, which results in great self-discharge; Cathode current collector could be corroded in hydrochloride solution; and the corrosion of anode in sulfate cannot be ignored.

SUMMARY OF THE INVENTION

The present invention aims to provide an electrolyte for a battery which has a god chemical stability and suppress the corrosion of the battery.

According to one aspect the invention provides an electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; the anions of the electrolyte include alkyl sulfonate ions.

Preferably the alkyl sulfonate ions are methyl sulfonate ions.

Preferably the concentration of the alkyl sulfonate ions in the electrolyte is 0.5~12 mol/L.

Preferably the concentration of the first metal ions is 1-7 mol/L; the concentration of the second metal ions is 1-4 mol/L.

Preferably the first metal ions are selected from Li ions; the second metal ions are selected from zinc ions.

Preferably the solvent is an aqueous solution or alcohol solution.

Preferably the electrolyte further comprises an electrolyte additive which is a bismuth compound.

Preferably the bismuth compound is selected from bismuth trioxide and/or bismuth nitrate.

Preferably the weight percentage range of the bismuth compound in the electrolyte is 0.01-5%.

Preferably the anions of the electrolyte further comprise at least one of sulfate ions, chloride ions, acetate ions and nitrate ions.

More preferably the molar ratio of the sulfate ions and the alkyl sulfonate ions is 1:21-27:7.

Preferably the pH range of the electrolyte is 3-7.

According to one aspect the invention provides a battery comprising a cathode, an anode and an electrolyte, wherein the cathode comprises a cathode material, the cathode material comprises a cathode active material which is capable of reversibly intercalating-deintercalating a first metal ions; the anode comprises a substrate for charge and discharge of the anode; the electrolyte is provided as above in the invention.

Preferably the anode further comprises an anode additive which is a bismuth compound Preferably the bismuth compound is selected from bismuth trioxide and/or bismuth nitrate.

Preferably the weight percentage range of the bismuth compound in the anode is 0.1-10%.

Preferably the battery further comprises an anode modifier which is selected from at least one of gelatin, agar, cellulose, cellulose ether and soluble salt thereof, dextrin and cyclodextrin.

Preferably the cyclodextrin is selected from at least one of α-cyclodextrin, β-cyclodextrin and γ-cyclodextrin; the cellulose ether is selected from carboxymethyl cellulose or hydroxypropyl methyl cellulose.

Preferably the average molecular weight of the anode modifier is 2,000 to 2,000,000.

Preferably the anode modifier is contained in a coating layer on the surface of the anode.

Preferably the coating layer further includes the second metal ions.

Preferably the thickness of the coating layer is 5~40 μm.

Preferably the anode modifier is in the electrolyte of which the weight percentage range in the electrolyte is 0.01-2%.

Preferably the cathode material further comprises conductive agent graphite, wherein the particle size of the conductive agent graphite is less than 50 μm and the crystallinity of the conductive agent graphite is no less than 90%.

Preferably the graphite comprises a first graphite and a second graphite, the particle size of the first graphite is 15-50 μm and the particle size of the second graphite is 5 to 15 μm.

Preferably the weight percentage range of the first graphite and the second graphite in the graphite are 30-50% and 40-60% respectively.

Preferably the particle size d10 of graphite is 6 μm.

Preferably the particle size of graphite is greater than 0.5 μm.

Preferably the weight percentage range of the conductive agent graphite in the cathode material is 6-15%.

According to one aspect the invention provides a battery comprising a cathode, an anode and an electrolyte, the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the anode is selected from metal, alloy or carbon-based material; wherein the electrolyte is as described above.

According to one aspect the invention provides a battery comprising a cathode, two anodes and an electrolyte, the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the combined current collector has two opposite surfaces and the cathode plate is formed on the two opposite surfaces; two anode share the cathode; the anode is selected from metal, alloy or carbon-based material; wherein the electrolyte is as described above.

According to one aspect the invention provides a battery comprising two cathodes, an anode and an electrolyte, the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the combined current collector has two opposite surfaces and the cathode plate is formed on at least one surface of the combined current collector that faces to the anode; two cathodes share the anode; the anode is selected from metal, alloy or carbon-based material; wherein the electrolyte is as described above.

According to one aspect the invention provides a battery comprising a cathode, an anode and an electrolyte, the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the combined current collector has two opposite surfaces and the cathode plate is formed on at least one surface of the combined current collector that faces to the anode; the anode is selected from metal, alloy or carbon-based material; the battery comprises n pair of cathodes and anode, wherein n≥2; the cathodes and anodes are arranged alternately, two adjacent cathodes share the anode which is located between the two adjacent cathodes and two adjacent anodes share the cathode which is located between the two adjacent anodes; wherein the electrolyte is as described above.

Preferably the bismuth compound is selected from bismuth trioxide and/or bismuth nitrate.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

According to one aspect the invention provides a battery comprising a cathode, at least one bipolar electrode, an anode and an electrolyte, the cathode comprises a combined current collector and a cathode plate which is formed on one surface of the combined current collector, the combined current collector comprises a cathode current collector and a conductive film which is coated on the cathode current collector, the cathode plate comprises a cathode active material which is capable of reversibly intercalating-deintercalating the first metal ions; the bipolar electrode which is located between the cathode and the anode comprises a bipolar current collector and the cathode plate, the bipolar current collector has two opposite surfaces which are defined as a first surface and a second surface, the cathode plate is formed on the first surface; the second metal ions that can be reduced to a metallic state and deposited on the second surface of the bipolar current collector during a charge cycle and be oxidized from the metallic state to the second metal ions during a discharge cycle; the anode is selected from metal, alloy or carbon-based material; the electrolyte is located between the cathode and the anode; wherein the electrolyte is as described above.

Preferably the anode and/or the electrolyte further comprise an additive which is selected from bismuth trioxide and/or bismuth nitrate.

Preferably a seal part is formed and arranged at the outer circumference part of a part of the bipolar current collector.

Preferably the material of the bipolar current collector is selected from a conductive plastic, stainless steel or passivated stainless steel.

Preferably the material of the conductive plastic is a conductive polymer.

Preferably the material of the conductive plastic comprises a polymer and a conductive agent.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

Preferably the cathode plate further comprises a carrier which is electrochemically inert, the cathode active material is formed on the carrier.

Preferably the carrier has a porous structure and is electrical insulation.

Preferably the pore size range of the carrier is 50-200 meshes.

Preferably the carrier can conduct electron.

Preferably the material of the carrier is selected from at least one of polyethylene terephthalate, polybutylene terephthalate, polyethylene, polypropylene, polyamide, polyurethane and polyacrylonitrile.

Preferably the carrier is a non-woven fabric.

Preferably the thickness range of the carrier is less than 1 mm.

Preferably the carrier has two opposite surfaces and the cathode active material is formed on both surfaces of the carrier.

Preferably the cathode active material is formed on the carrier by means of slurry method.

Preferably the conductive film is a thermoplastic polymer.

Preferably the conductive film is bonded to the cathode current collector by means of hot pressing, vacuum pumping or spraying.

Preferably the cathode plate is bonded to the combined current collector by means of hot pressing or bonding.

Preferably the cathode active material has a spinel structure, layered structure or an olivine structure.

Preferably the cathode current collector is selected from at least one of glassy carbon, graphite foil, graphite sheet, carbon cloth, carbon felt, carbon fibers, or Al, Fe, Cu, Pb, Ti, Mo, Co, Ag or passivated metal thereof or stainless steel, carbon steel, Al alloy, Ni alloy, Ti alloy, Cu alloy, Co alloy, Ti—Pt alloy, Pt—Rh alloy or passivated alloy thereof.

Preferably the battery further comprises a separator which is retaining the electrolyte.

Compared with prior art, the electrolyte is not easy to be oxidized, chemical stable and could effectively improve the solubility of the first metal ions and the second metal ions, inhibit the generation of gas, reduce the battery corrosion and self discharge, and cannot be frozen at −20□ and has good low temperature performance.

The present invention aims to provide a battery which could reduce gas production when being used.

According to one aspect the invention provides a battery comprising a cathode, an anode and an electrolyte, wherein the cathode comprises a cathode material, the cathode material comprises a cathode active material which is capable of reversibly intercalating-deintercalating a first metal ions; the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; and the anode and/or the electrolyte further comprise an additive which is a bismuth compound.

Preferably the bismuth compound is selected from bismuth trioxide and/or bismuth nitrate.

Preferably the weight percentage range of the bismuth compound in the electrolyte is 0.01-5%.

Preferably the weight percentage range of the bismuth compound in the anode is 0.1-10%.

Preferably the anions of the electrolyte include alkyl sulfonate ions.

Preferably the alkyl sulfonate ions are methyl sulfonate ions.

Preferably the concentration of the alkyl sulfonate ions in the electrolyte is 0.5~12 mol/L.

Preferably the anions of the electrolyte further comprise at least one of sulfate ions, chloride ions, acetate ions and nitrate ions.

Preferably the battery further comprises an anode modifier which is selected from at least one of gelatin, agar, cellulose, cellulose ether and soluble salt thereof, dextrin and cyclodextrin.

Preferably the cyclodextrin is selected from at least one of α-cyclodextrin, β-cyclodextrin and γ-cyclodextrin; the cellulose ether is selected from carboxymethyl cellulose or hydroxypropyl methyl cellulose.

Preferably the average molecular weight of the anode modifier is 2,000 to 2,000,000.

Preferably the anode modifier is contained in a coating layer on the surface of the anode.

Preferably the coating layer further includes the second metal ions.

Preferably the thickness of the coating layer is 5~40 μm.

Preferably the weight percentage range of the anode modifier in the electrolyte is 0.01-2%.

Preferably the battery further includes a separator which is located between the cathode and the anode.

Preferably the first metal ions are selected from Li and Na ions.

Preferably the cathode active material is selected from at least one of $LiMn_2O_4$, $LiFePO_4$ or $LiCoO_2$.

Preferably the second metal ions are selected from manganese ions, iron ions, copper ions, zinc ions, chromium ions, nickel ions, tin ions or lead ions.

Preferably the solvent is an aqueous solution or alcohol solution.

Preferably the pH range of the electrolyte is 3-7.

Preferably the cathode material further comprises conductive agent graphite, wherein the particle size of the conductive agent graphite is less than 50 μm and the crystallinity of the conductive agent graphite is no less than 90%.

Preferably the graphite comprises a first graphite and a second graphite, the particle size of the first graphite is 15-50 μm and the particle size of the second graphite is 5 to 15 μm.

Preferably the weight percentage range of the first graphite and the second graphite in the graphite are 30-50% and 40-60% respectively.

Preferably the particle size d10 of graphite is 6 μm.

Preferably the particle size of graphite is greater than 0.5 μm.

Preferably the weight percentage range of the conductive agent graphite in the cathode material is 6-15%.

According to one aspect the invention provides a battery comprising a cathode, an anode and an electrolyte, wherein the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the anode is selected from metal, alloy or carbon-based material; and the anode and/or the electrolyte further comprise an additive which is a bismuth compound.

According to one aspect the invention provides a battery comprising a cathode, two anodes and an electrolyte, wherein the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the combined current collector has two opposite surfaces and the cathode plate is formed on the two opposite surfaces; two anode share the cathode; the anode is selected from metal, alloy or carbon-based material; and the anode and/or the electrolyte further comprise an additive which is a bismuth compound.

According to one aspect the invention provides a battery comprising two cathodes, an anode and an electrolyte, wherein the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the combined current collector has two opposite surfaces and the cathode plate is formed on at least one surface of the combined current collector that faces to the anode; two cathodes share the anode; the anode is selected from metal, alloy or carbon-based material; and the anode and/or the electrolyte further comprise an additive which is a bismuth compound.

According to one aspect the invention provides a battery comprising a cathode, an anode and an electrolyte, wherein the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the combined current collector has two opposite surfaces and the cathode plate is formed on at least one surface of the combined current collector that faces to the anode; the anode is selected from metal, alloy or carbon-based material; the battery comprises n pair of cathodes and anode, wherein n≥2; the cathodes and anodes are arranged alternately, two adjacent cathodes share the anode which is located between the two adjacent cathodes and two adjacent anodes share the cathode which is located between the two adjacent anodes; and the anode and/or the electrolyte further comprise an additive which is a bismuth compound.

Preferably the bismuth compound is selected from bismuth trioxide and/or bismuth nitrate.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

According to one aspect the invention provides a battery comprising a cathode, at least one bipolar electrode, an anode and an electrolyte, wherein the electrolyte comprises at least a solvent capable of dissolving solute, the solute being ionized to a second metal ions and a first metal ions that can deintercalate from the cathode active material during the charge cycle and intercalate into the cathode active material during the discharge cycle; the cathode comprises a combined current collector and a cathode plate which is formed on one surface of the combined current collector, the combined current collector comprises a cathode current collector and a conductive film which is coated on the cathode current collector, the cathode plate comprises a cathode active material which is capable of reversibly intercalating-deintercalating the first metal ions; the bipolar electrode which is located between the cathode and the anode comprises a bipolar current collector and the cathode plate, the bipolar current collector has two opposite surfaces which are defined as a first surface and a second surface, the cathode plate is formed on the first surface; the second metal ions that can be reduced to a metallic state and deposited on the second surface of the bipolar current collector during a charge cycle and be oxidized from the metallic state to the second metal ions during a discharge cycle; the anode is selected from metal, alloy or carbon-based material; the electrolyte is located between the cathode and the anode; and the anode and/or the electrolyte further comprise an additive which is a bismuth compound.

Preferably the bismuth compound is selected from bismuth trioxide and/or bismuth nitrate.

Preferably a seal part is formed and arranged at the outer circumference part of a part of the bipolar current collector.

Preferably the material of the bipolar current collector is selected from a conductive plastic, stainless steel or passivated stainless steel.

Preferably the material of the conductive plastic is a conductive polymer.

Preferably the material of the conductive plastic comprises a polymer and a conductive agent.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

Preferably the cathode plate further comprises a carrier which is electrochemically inert, the cathode active material is formed on the carrier.

Preferably the carrier has a porous structure and is electrical insulation.

Preferably the pore size range of the carrier is 50-200 meshes.

Preferably the carrier can conduct electron.

Preferably the material of the carrier is selected from at least one of polyethylene terephthalate, polybutylene terephthalate, polyethylene, polypropylene, polyamide, polyurethane and polyacrylonitrile.

Preferably the carrier is a non-woven fabric.

Preferably the thickness range of the carrier is less than 1 mm.

Preferably the carrier has two opposite surfaces and the cathode active material is formed on both surfaces of the carrier.

Preferably the cathode active material is formed on the carrier by means of slurry method.

Preferably the conductive film is a thermoplastic polymer.

Preferably the conductive film is bonded to the cathode current collector by means of hot pressing, vacuum pumping or spraying.

Preferably the cathode plate is bonded to the combined current collector by means of hot pressing or bonding.

Preferably the cathode active material has a spinel structure, layered structure or an olivine structure.

Preferably the cathode current collector is selected from at least one of glassy carbon, graphite foil, graphite sheet, carbon cloth, carbon felt, carbon fibers, or Al, Fe, Cu, Pb, Ti, Mo, Co, Ag or passivated metal thereof or stainless steel, carbon steel, Al alloy, Ni alloy, Ti alloy, Cu alloy, Co alloy, Ti—Pt alloy, Pt—Rh alloy or passivated alloy thereof.

Preferably the battery further comprises a separator which is retaining the electrolyte.

Compared with prior art, the anode and/or the electrolyte further comprises a bismuth compound which can effectively inhibit the generation of gas, avoid the battery swelling, enhance the safety performance of the battery and suppress degradation of the battery performance.

The present invention aims to provide a battery which has a good safety performance.

According to one aspect the invention provides a battery comprising a cathode, an anode and an electrolyte, wherein the cathode comprises a cathode active material which is capable of reversibly intercalating and deintercalating a first metal ions; the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions; the battery further comprises an anode modifier which is selected from at least one of gelatin, agar, cellulose, cellulose ether and soluble salt thereof, dextrin and cyclodextrin.

Preferably the cyclodextrin is selected from at least one of α-cyclodextrin, β-cyclodextrin and γ-cyclodextrin; the cellulose ether is selected from carboxymethyl cellulose or hydroxypropyl methyl cellulose.

Preferably the average molecular weight of the anode modifier is 2,000 to 2,000,000.

Preferably the anode modifier is contained in a coating layer on the surface of the anode.

Preferably the coating layer further includes the second metal ions.

Preferably the thickness of the coating layer is 5~40 μm.

Preferably the weight percentage range of the anode modifier in the electrolyte is 0.01-2%.

Preferably the anode and/or the electrolyte further comprise an additive which is a bismuth compound.

Preferably the bismuth compound is selected from bismuth trioxide and/or bismuth nitrate.

Preferably the weight percentage range of the bismuth compound in the electrolyte is 0.01-5%.

Preferably the weight percentage range of the bismuth compound in the anode is 0.1-10%.

Preferably the anions of the electrolyte include alkyl sulfonate ions.

Preferably the alkyl sulfonate ions are methyl sulfonate ions.

Preferably the concentration of the alkyl sulfonate ions in the electrolyte is 0.5~12 mol/L.

Preferably the anions of the electrolyte further comprise at least one of sulfate ions, chloride ions, acetate ions and nitrate ions.

Preferably the battery further includes a separator which is located between the cathode and the anode.

Preferably the first metal ions are selected from Li and Na ions.

Preferably the cathode active material is selected from at least one of $LiMn_2O_4$, $LiFePO_4$ or $LiCoO_2$.

Preferably the second metal ions are selected from manganese ions, iron ions, copper ions, zinc ions, chromium ions, nickel ions, tin ions or lead ions.

Preferably the solvent is an aqueous solution or alcohol solution.

Preferably the cathode material further comprises conductive agent graphite, wherein the particle size of the conductive agent graphite is less than 50 μm and the crystallinity of the conductive agent graphite is no less than 90%.

Preferably the graphite comprises a first graphite and a second graphite, the particle size of the first graphite is 15-50 μm and the particle size of the second graphite is 5 to 15 μm.

Preferably the weight percentage range of the first graphite and the second graphite in the graphite are 30-50% and 40-60% respectively.

Preferably the particle size d10 of graphite is 6 μm.

Preferably the particle size of graphite is greater than 0.5 μm.

Preferably the weight percentage range of the conductive agent graphite in the cathode material is 6-15%.

According to one aspect the invention provides a battery comprising a cathode, an anode and an electrolyte, wherein the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the anode is selected from metal, alloy or carbon-based material; the battery further comprises an anode modifier which is selected from at least one of gelatin, agar, cellulose, cellulose ether and soluble salt thereof, dextrin and cyclodextrin.

According to one aspect the invention provides a battery comprising a cathode, two anodes and an electrolyte, wherein the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the combined current collector has two opposite surfaces and the cathode plate is formed on the two opposite surfaces; two anode share the cathode; the anode is selected from metal, alloy or carbon-based material; the battery further comprises an anode modifier which is selected from at least one of gelatin, agar, cellulose, cellulose ether and soluble salt thereof, dextrin and cyclodextrin.

According to one aspect the invention provides a battery comprising two cathodes, an anode and an electrolyte, wherein the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the combined current collector has two opposite surfaces and the cathode plate is formed on at least one surface of the combined current collector that faces to the anode; two cathodes share the anode; the anode is selected from metal, alloy or carbon-based material; the battery further comprises an anode modifier which is selected from at least one of gelatin, agar, cellulose, cellulose ether and soluble salt thereof, dextrin and cyclodextrin.

According to one aspect the invention provides a battery comprising a cathode, an anode and an electrolyte, wherein the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the combined current collector has two opposite surfaces and the cathode plate is formed on at least one surface of the combined current collector that faces to the anode; the anode is selected from metal, alloy or carbon-based material; the battery comprises n pair of cathodes and anode, wherein n≥2; the cathodes and anodes are arranged alternately, two adjacent cathodes share the anode which is located between the two adjacent cathodes and two adjacent anodes share the cathode which is located between the two adjacent anodes; the battery further comprises an anode modifier which is selected from at least one of gelatin, agar, cellulose, cellulose ether and soluble salt thereof, dextrin and cyclodextrin.

Preferably the anode and/or the electrolyte further comprise an additive which is a bismuth compound.

Preferably the bismuth compound is selected from bismuth trioxide and/or bismuth nitrate.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

According to one aspect the invention provides a battery comprising a cathode, at least one bipolar electrode, an anode and an electrolyte, wherein the electrolyte comprises at least a solvent capable of dissolving solute, the solute being ionized to a second metal ions and a first metal ions that can deintercalate from the cathode active material during the charge cycle and intercalate into the cathode active material during the discharge cycle; the cathode comprises a combined current collector and a cathode plate which is formed on one surface of the combined current collector, the combined current collector comprises a cathode current collector and a conductive film which is coated on the cathode current collector, the cathode plate comprises a cathode active material which is capable of reversibly intercalating-deintercalating the first metal ions; the bipolar electrode which is located between the cathode and the anode comprises a bipolar current collector and the cathode plate, the bipolar current collector has two opposite surfaces which are defined as a first surface and a second surface, the cathode plate is formed on the first surface; the second metal ions that can be reduced to a metallic state and deposited on the second surface of the bipolar current collector during a charge cycle and be oxidized from the metallic state to the second metal ions during a discharge cycle; the anode is selected from metal, alloy or carbon-based material; the electrolyte is located between the cathode and the anode; the battery further comprises an anode modifier which is selected from at least one of gelatin, agar, cellulose, cellulose ether and soluble salt thereof, dextrin and cyclodextrin.

Preferably the anode and/or the electrolyte further comprise an additive which is a bismuth compound.

Preferably the bismuth compound is selected from bismuth trioxide and/or bismuth nitrate.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

According to one aspect the invention provides a battery comprising a cathode, at least one bipolar electrode, an anode and an electrolyte, the cathode comprises a combined current collector and a cathode plate which is formed on one surface of the combined current collector, the combined current collector comprises a cathode current collector and a conductive film which is coated on the cathode current collector, the cathode plate comprises a cathode active material which is capable of reversibly intercalating-deintercalating the first metal ions; the bipolar electrode which is located between the cathode and the anode comprises a bipolar current collector and the cathode plate, the bipolar current collector has two opposite surfaces which are defined as a first surface and a second surface, the cathode plate is formed on the first surface; wherein the electrolyte comprises at least a solvent capable of dissolving solute, the solute being ionized to a second metal ions that can be reduced to a metallic state and deposited on the anode during a charge cycle and be oxidized from the metallic state to the second metal ions during a discharge cycle and a first metal ions that can deintercalate from the cathode active material during the charge cycle and intercalate into the cathode active material during the discharge cycle; the second metal ions that can be reduced to a metallic state and deposited on the second surface of the bipolar current collector during a charge cycle; the anode is selected from metal, alloy or carbon-based material; the electrolyte is located between the cathode and the anode; the battery further comprises an anode modifier which is selected from at least one of gelatin, agar, cellulose, cellulose ether and soluble salt thereof, dextrin and cyclodextrin.

Preferably the bismuth compound is selected from bismuth trioxide and/or bismuth nitrate.

Preferably a seal part is formed and arranged at the outer circumference part of a part of the bipolar current collector.

Preferably the material of the bipolar current collector is selected from a conductive plastic, stainless steel or passivated stainless steel.

Preferably the material of the conductive plastic is a conductive polymer.

Preferably the material of the conductive plastic comprises a polymer and a conductive agent.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

Preferably the cathode plate further comprises a carrier which is electrochemically inert, the cathode active material is formed on the carrier.

Preferably the carrier has a porous structure and is electrical insulation.

Preferably the pore size range of the carrier is 50-200 meshes.

Preferably the carrier can conduct electron.

Preferably the material of the carrier is selected from at least one of polyethylene terephthalate, polybutylene terephthalate, polyethylene, polypropylene, polyamide, polyurethane and polyacrylonitrile.

Preferably the carrier is a non-woven fabric.

Preferably the thickness range of the carrier is less than 1 mm.

Preferably the carrier has two opposite surfaces and the cathode active material is formed on both surfaces of the carrier.

Preferably the cathode active material is formed on the carrier by means of slurry method.

Preferably the conductive film is a thermoplastic polymer.

Preferably the conductive film is bonded to the cathode current collector by means of hot pressing, vacuum pumping or spraying.

Preferably the cathode plate is bonded to the combined current collector by means of hot pressing or bonding.

Preferably the cathode active material has a spinel structure, layered structure or an olivine structure.

Preferably the cathode current collector is selected from at least one of glassy carbon, graphite foil, graphite sheet, carbon cloth, carbon felt, carbon fibers, or Al, Fe, Cu, Pb, Ti, Mo, Co, Ag or passivated metal thereof or stainless steel, carbon steel, Al alloy, Ni alloy, Ti alloy, Cu alloy, Co alloy, Ti—Pt alloy, Pt—Rh alloy or passivated alloy thereof.

Preferably the battery further comprises a separator which is retaining the electrolyte.

Compared with prior art, the battery comprises an anode modifier which can effectively inhibit the generation of dendrite and gas, avoid the side reaction between the electrolyte and the anode, improve the safety performance and cycleability of the battery.

The present invention aims to provide a cathode material for a battery which has a good stability and corrosion resistance.

According to one aspect the invention provides cathode material for a battery comprising a cathode active material which is capable of reversibly intercalating-deintercalating a first metal ions and a conductive agent graphite; wherein the particle size of the conductive agent graphite is less than 50 μm and the crystallinity of the conductive agent graphite is no less than 90%.

Preferably the graphite comprises a first graphite and a second graphite, the particle size of the first graphite is 15-50 μm and the particle size of the second graphite is 5 to 15 μm.

Preferably the weight percentage range of the first graphite and the second graphite in the graphite are 30-50% and 40-60% respectively.

Preferably the particle size d10 of graphite is 6 μm.

Preferably the particle size of graphite is greater than 0.5 μm.

Preferably the weight percentage range of the conductive agent graphite in the cathode material is 6-15%.

According to one aspect the invention provides a battery comprising a cathode, an anode and an electrolyte, wherein the cathode comprises the cathode material provided by the invention.

Preferably the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle.

Preferably the first metal ions are selected from Li, Na, Mg or Zn ions.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

Preferably the battery further comprises an anode modifier which is selected from at least one of gelatin, agar, cellulose, cellulose ether and soluble salt thereof, dextrin and cyclodextrin.

Preferably the cyclodextrin is selected from at least one of α-cyclodextrin, β-cyclodextrin and γ-cyclodextrin; the cellulose ether is selected from carboxymethyl cellulose or hydroxypropyl methyl cellulose.

Preferably the average molecular weight of the anode modifier is 2,000 to 2,000,000.

Preferably the anode modifier is contained in a coating layer on the surface of the anode.

Preferably the coating layer further includes the second metal ions.

Preferably the thickness of the coating layer is 5~40 μm.

Preferably the weight percentage range of the anode modifier in the electrolyte is 0.01-2%.

Preferably the anode and/or the electrolyte further comprise an additive which is a bismuth compound.

Preferably the bismuth compound is selected from bismuth trioxide and/or bismuth nitrate.

Preferably the weight percentage range of the bismuth compound in the electrolyte is 0.01-5%.

Preferably the weight percentage range of the bismuth compound in the anode is 0.1-10%.

Preferably the anions of the electrolyte include alkyl sulfonate ions.

Preferably the alkyl sulfonate ions are methyl sulfonate ions.

Preferably the concentration of the alkyl sulfonate ions in the electrolyte is 0.5~12 mol/L.

Preferably the anions of the electrolyte further comprise at least one of sulfate ions, chloride ions, acetate ions and nitrate ions.

Preferably the battery further includes a separator which is located between the cathode and the anode.

Preferably the cathode active material is selected from at least one of $LiMn_2O_4$, $LiFePO_4$ or $LiCoO_2$.

Preferably the second metal ions are selected from manganese ions, iron ions, copper ions, zinc ions, chromium ions, nickel ions, tin ions or lead ions.

Preferably the solvent is an aqueous solution or alcohol solution.

Preferably the cathode comprises a combined current collector and a cathode plate, the combined current collector comprises a cathode current collector and a conductive film which is coated on the cathode current collector, the cathode plate comprises the cathode material; the anode is selected from metal, alloy or carbon-based material.

According to one aspect the invention provides a battery comprising a cathode, an anode and an electrolyte, wherein the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; the cathode comprises a combined current collector and a cathode plate, the combined current collector comprises a cathode current collector and a conductive film which is coated on the cathode current collector, the cathode plate comprises the cathode material which is provided in the invention; the anode is selected from metal, alloy or carbon-based material.

According to one aspect the invention provides a battery comprising a cathode, two anodes and an electrolyte, wherein the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; the cathode comprises a combined current collector and a cathode plate, the combined current collector comprises a cathode current collector and a conductive film which is coated on the cathode current collector, the cathode plate comprises the cathode material which is provided in the invention; the combined current collector has two opposite surfaces and the cathode plate is formed on the two opposite surfaces; two anodes share the cathode; the anode is selected from metal, alloy or carbon-based material.

According to one aspect the invention provides a battery comprising two cathodes, an anode and an electrolyte, wherein the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; the cathode comprises a combined current collector and a cathode plate, the combined current collector comprises a cathode current collector and a conductive film which is coated on the cathode current collector, the cathode plate comprises a cathode material which is provided in the invention; the combined current collector has two opposite surfaces and the cathode plate is formed on at least one surface of the combined current collector that faces to the anode; two cathodes share the anode; the anode is selected from metal, alloy or carbon-based material.

According to one aspect the invention provides a battery comprising a cathode, an anode and an electrolyte, wherein the electrolyte comprises at least a solvent capable of dissolving solute, the solute being ionized to a second metal ions that can be reduced to a metallic state during a charge cycle and be oxidized from the metallic state to the second metal ions during a discharge cycle and the first metal ions that can deintercalate from the cathode active material during the charge cycle and intercalate into the cathode active material during the discharge cycle; the cathode comprises a combined current collector and a cathode plate, the combined current collector comprises a cathode current collector and a conductive film which is coated on the cathode current collector, the cathode plate comprises a cathode material which is provided in the invention; the combined current collector has two opposite surfaces and the cathode plate is formed on at least one surface of the combined current collector that faces to the anode; the anode is selected from metal, alloy or carbon-based material; the battery comprises n pair of cathodes and anode, wherein $n \geq 2$; the cathodes and anodes are arranged alternately, two adjacent cathodes share the anode which is located between the two adjacent cathodes and two adjacent anodes share the cathode which is located between the two adjacent anodes.

Preferably the anode and/or the electrolyte further comprise an additive which is a bismuth compound.

Preferably the bismuth compound is selected from bismuth trioxide and/or bismuth nitrate.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

According to one aspect the invention provides a battery comprising a cathode, at least one bipolar electrode, an anode and an electrolyte, wherein the electrolyte comprises at least a solvent capable of dissolving solute, the solute being ionized to a second metal ions that can be reduced to a metallic state and deposited on the anode during a charge cycle and be oxidized from the metallic state to the second metal ions during a discharge cycle and a first metal ions that can deintercalate from the cathode active material during the charge cycle and intercalate into the cathode active material during the discharge cycle; the second metal ions that can be reduced to a metallic state and deposited on the second surface of the bipolar current collector during a charge cycle; the cathode comprises a combined current collector and a cathode plate which is formed on one surface of the combined current collector, the combined current collector comprises a cathode current collector and a conductive film which is coated on the cathode current collector, the cathode plate comprises a cathode material which is provided in the invention; the bipolar electrode which is located between the cathode and the anode comprises a bipolar current collector and the cathode plate, the bipolar current collector has two opposite surfaces which are defined as a first surface and a second surface, the cathode plate is formed on the first surface; the anode is selected from metal, alloy or carbon-based material; the electrolyte is located between the cathode and the anode.

Preferably a seal part is formed and arranged at the outer circumference part of a part of the bipolar current collector.

Preferably the material of the bipolar current collector is selected from a conductive plastic, stainless steel or passivated stainless steel.

Preferably the material of the conductive plastic is a conductive polymer.

Preferably the material of the conductive plastic comprises a polymer and a conductive agent.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

Preferably the cathode plate further comprises a carrier which is electrochemically inert, the cathode active material is formed on the carrier.

Preferably the carrier has a porous structure and is electrical insulation.

Preferably the pore size range of the carrier is 50-200 meshes.

Preferably the carrier can conduct electron.

Preferably the material of the carrier is selected from at least one of polyethylene terephthalate, polybutylene terephthalate, polyethylene, polypropylene, polyamide, polyurethane and polyacrylonitrile.

Preferably the carrier is a non-woven fabric.

Preferably the thickness range of the carrier is less than 1 mm.

Preferably the carrier has two opposite surfaces and the cathode active material is formed on both surfaces of the carrier.

Preferably the cathode active material is formed on the carrier by means of slurry method.

Preferably the conductive film is a thermoplastic polymer.

Preferably the conductive film is bonded to the cathode current collector by means of hot pressing, vacuum pumping or spraying.

Preferably the cathode plate is bonded to the combined current collector by means of hot pressing or bonding.

Preferably the cathode active material has a spinel structure, layered structure or an olivine structure.

Preferably the cathode current collector is selected from at least one of glassy carbon, graphite foil, graphite sheet, carbon cloth, carbon felt, carbon fibers, or Al, Fe, Cu, Pb, Ti, Mo, Co, Ag or passivated metal thereof or stainless steel, carbon steel, Al alloy, Ni alloy, Ti alloy, Cu alloy, Co alloy, Ti—Pt alloy, Pt—Rh alloy or passivated alloy thereof.

Preferably the battery further comprises a separator which is retaining the electrolyte.

Compared with prior art, the conductive agent of the cathode material has the suitable particle size, which can be well balanced with the electric conductivity and stability, thus avoid the corrosion of the conductive agent graphite, reduce the gas production of battery, enhance the safety performance of the battery, and also effectively suppress the battery performance degradation.

The present invention aims to provide a battery which has a good cycleability and high energy.

According to one aspect the invention provides a battery comprising a cathode, an anode and an electrolyte, wherein the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the anode is selected from metal, alloy or carbon-based material; the electrolyte comprises at least a solvent capable of dissolving solute, the solute at least being ionized to a second metal ions that can be reduced to a metallic state as an anode active material which is deposited on the anode during a charge cycle and be oxidized from the metallic state to the second metal ions during a discharge cycle.

According to one aspect the invention provides a battery comprising a cathode, two anodes and an electrolyte, wherein the cathode comprises a combined current collector and a cathode plate, the combined current collector comprises a cathode current collector and a conductive film which is coated on the cathode current collector, the cathode plate comprises a cathode active material which is capable of reversibly intercalating and deintercalating a first metal ions; the combined current collector has two opposite surfaces and the cathode plate is formed on the two opposite surfaces; two anode share the cathode; the anode is selected from metal, alloy or carbon-based material; the electrolyte comprises at least a solvent capable of dissolving solute, the solute at least being ionized to a second metal ions that can be reduced to a metallic state as an anode active material which is deposited on the anode during a charge cycle and be oxidized from the metallic state to the second metal ions during a discharge cycle.

According to one aspect the invention provides a battery comprising two cathodes, an anode and an electrolyte, wherein the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the combined current collector has two opposite surfaces and the cathode plate is formed on at least one surface of the combined current collector that faces to the anode; two cathodes share the anode; the anode is selected from metal, alloy or carbon-based material; the electrolyte comprises at least a solvent capable of dissolving solute, the solute at least being ionized to a second metal ions that can be reduced to a metallic state as an anode active material which is deposited on the anode during a charge cycle and be oxidized from the metallic state to the second metal ions during a discharge cycle.

According to one aspect the invention provides a battery comprising a cathode, an anode and an electrolyte, wherein the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the combined current collector has two opposite surfaces and the cathode plate is formed on at least one surface of the combined current collector that faces to the anode; the anode is selected from metal, alloy or carbon-based material; the battery comprises n pair of cathodes and anode, wherein n≥2; the cathodes and anodes are arranged alternately, two adjacent cathodes share the anode which is located between the two adjacent cathodes and two adjacent anodes share the cathode which is located between the two adjacent anodes; the electrolyte comprises at least a solvent capable of dissolving solute, the solute being ionized to at least a second metal ions that can be reduced to a metallic state as an anode active material which is deposited on the anode during a charge cycle and be oxidized from the metallic state to the second metal ions during a discharge cycle.

Preferably the anode and/or the electrolyte further comprise an additive which is a bismuth compound.

Preferably the bismuth compound is selected from bismuth trioxide and/or bismuth nitrate.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

According to one aspect the invention provides a battery comprising a cathode, at least one bipolar electrode, an anode and an electrolyte, wherein the cathode comprises a combined current collector and a cathode plate which is formed on one surface of the combined current collector, the combined current collector comprises a cathode current collector and a conductive film which is coated on the cathode current collector, the cathode plate comprises a cathode active material which is capable of reversibly intercalating-deintercalating the first metal ions; the bipolar electrode which is located between the cathode and the anode comprises a bipolar current collector and the cathode plate, the bipolar current collector has two opposite surfaces which are defined as a first surface and a second surface, the cathode plate is formed on the first surface; the electrolyte comprises at least a solvent capable of dissolving solute, the solute being ionized to at least a second metal ions that can be reduced to a metallic state and deposited on the second surface of the bipolar current collector as an anode active material during a charge cycle and the anode active material be oxidized from the metallic state to the second metal ions during a discharge cycle; the anode is selected from metal, alloy or carbon-based material; the electrolyte is located between the cathode and the anode.

Preferably the anode and/or the electrolyte further comprise an additive which is a bismuth compound.

Preferably the bismuth compound is selected from bismuth trioxide and/or bismuth nitrate.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

According to one aspect the invention provides a battery comprising a cathode, at least one bipolar electrode, an anode and an electrolyte, wherein the cathode comprises a combined current collector and a cathode plate which is formed on one surface of the combined current collector, the combined current collector comprises a cathode current collector and a conductive film which is coated on the cathode current collector, the cathode plate comprises a cathode active material which is capable of reversibly intercalating-deintercalating the first metal ions; the bipolar electrode which is located between the cathode and the anode comprises a bipolar current collector and the cathode plate, the bipolar current collector has two opposite surfaces which are defined as a first surface and a second surface, the cathode plate is formed on the first surface; the electrolyte comprises at least a solvent capable of dissolving solute, the solute being ionized to a second metal ions that can be reduced to a metallic state and deposited on the anode during a charge cycle and be oxidized from the metallic state to the second metal ions during a discharge cycle and a first metal ions that can deintercalate from the cathode active material during the charge cycle and intercalate into the cathode active material during the discharge cycle; the second metal ions that can be reduced to a metallic state and deposited on the second surface of the bipolar current collector as a second metal during a charge cycle and the second metal be oxidized from the metallic state to the second metal ions during a discharge cycle; the anode is selected from metal, alloy or carbon-based material; the electrolyte is located between the cathode and the anode; and the battery further comprises an anode modifier which is selected from at least one of gelatin, agar, cellulose, cellulose ether and soluble salt thereof, dextrin and cyclodextrin.

According to one aspect the invention provides a battery comprising a cathode, an anode and an electrolyte, wherein the cathode comprises a combined current collector and a cathode plate, the combined current collector comprises a cathode current collector and a conductive film which is coated on the cathode current collector, the cathode plate comprises a cathode active material which is capable of reversibly intercalating-deintercalating a first metal ions; the anode is selected from metal, alloy or carbon-based material; the electrolyte comprises at least a solvent capable of dissolving solute, the solute being ionized to at least a second metal ions that can be reduced to a metallic state as an anode active material which is deposited in the anode during a charge cycle and the anode active material be oxidized from the metallic state to the second metal ions during a discharge cycle.

Preferably the number of the cathode is one and the number of the anode is two; the cathode comprises a combined current collector and a cathode plate, the combined current collector has two opposite surfaces and the cathode plate is formed on the two opposite surfaces; two anode share the cathode.

Preferably the number of the cathode is two and the number of the anode is one; the combined current collector has two opposite surfaces which are defined as a first surface and a second surface; the first surface faces to the anode; the cathode plate is formed on at least the first surface; two cathodes share the anode.

Preferably the cathode comprises a combined current collector and a cathode plate, the combined current collector has two opposite surfaces, the cathode plate is formed on at least one surface that faces to the anode; the anode is selected from metal, alloy or carbon-based material; the battery comprises n pair of cathodes and anode, wherein n≥2; the cathodes and anodes are arranged alternately, two adjacent cathodes share the anode which is located between the two adjacent cathodes and two adjacent anodes share the cathode which is located between the two adjacent anodes.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

Preferably the battery further comprises at least one bipolar electrode, the cathode comprises a combined current collector and a cathode plate which is formed on one surface of the combined current collector, the bipolar electrode which is located between the cathode and the anode comprises a bipolar current collector and the cathode plate, the bipolar current collector has two opposite surfaces which are defined as a first surface and a second surface, the cathode plate is formed on the first surface; the second metal ions that can be reduced to a metallic state and deposited on the second surface of the bipolar current collector as a second metal during a charge cycle and the second metal be oxidized from the metallic state to the second metal ions during a discharge cycle; the anode is selected from metal, alloy or carbon-based material; the electrolyte is located between the cathode and the anode.

Preferably the battery further comprises an anode modifier which is selected from at least one of gelatin, agar, cellulose, cellulose ether and soluble salt thereof, dextrin and cyclodextrin.

Preferably the cyclodextrin is selected from at least one of α-cyclodextrin, β-cyclodextrin and γ-cyclodextrin; the cellulose ether is selected from carboxymethyl cellulose or hydroxypropyl methyl cellulose.

Preferably the average molecular weight of the anode modifier is 2,000 to 2,000,000.

Preferably the anode modifier is contained in a coating layer on the surface of the anode.

Preferably the coating layer further includes the second metal ions.

Preferably the thickness of the coating layer is 5~40 μm.

Preferably the weight percentage range of the anode modifier in the electrolyte is 0.01-2%.

Preferably the anode and/or the electrolyte further comprise an additive which is a bismuth compound.

Preferably the bismuth compound is selected from bismuth trioxide and/or bismuth nitrate.

Preferably the weight percentage range of the bismuth compound in the electrolyte is 0.01-5%.

Preferably the weight percentage range of the bismuth compound in the anode is 0.1-10%.

Preferably the anions of the electrolyte include alkyl sulfonate ions.

Preferably the alkyl sulfonate ions are methyl sulfonate ions.

Preferably the concentration of the alkyl sulfonate ions in the electrolyte is 0.5~12 mol/L.

Preferably the anions of the electrolyte further comprise at least one of sulfate ions, chloride ions, acetate ions and nitrate ions.

Preferably the battery further includes a separator which is located between the cathode and the anode.

Preferably the first metal ions are selected from Li and Na ions.

Preferably the cathode active material is selected from at least one of $LiMn_2O_4$, $LiFePO_4$ or $LiCoO_2$.

Preferably the second metal ions are selected from manganese ions, iron ions, copper ions, zinc ions, chromium ions, nickel ions, tin ions or lead ions.

Preferably the solvent is an aqueous solution or alcohol solution.

Preferably the pH range of the electrolyte is 3-7.

Preferably the cathode material further comprises conductive agent graphite, wherein the particle size of the conductive agent graphite is less than 50 μm and the crystallinity of the conductive agent graphite is no less than 90%.

Preferably the graphite comprises a first graphite and a second graphite, the particle size of the first graphite is 15-50 μm and the particle size of the second graphite is 5 to 15 μm.

Preferably the weight percentage range of the first graphite and the second graphite in the graphite are 30-50% and 40-60% respectively.

Preferably the particle size d10 of graphite is 6 μm.

Preferably the particle size of graphite is greater than 0.5 μm.

Preferably the weight percentage range of the conductive agent graphite in the cathode material is 6-15%.

Preferably a seal part is formed and arranged at the outer circumference part of a part of the bipolar current collector.

Preferably the material of the bipolar current collector is selected from a conductive plastic, stainless steel or passivated stainless steel.

Preferably the material of the conductive plastic is a conductive polymer.

Preferably the material of the conductive plastic comprises a polymer and a conductive agent.

Preferably the anode is selected from at least one metal of Zn, Ni, Cu, Ag, Pb, Mn, Sn, Fe, Al or passivated metal thereof or an alloy thereof, or at least one of graphite foil, graphite sheet, carbon cloth, carbon felt, carbon fibers, or tinned copper or brass.

Preferably the cathode plate further comprises a carrier which is electrochemically inert, the cathode active material is formed on the carrier.

Preferably the carrier has a porous structure and is electrical insulation.

Preferably the pore size range of the carrier is 50-200 meshes.

Preferably the carrier can conduct electron.

Preferably the material of the carrier is selected from at least one of polyethylene terephthalate, polybutylene terephthalate, polyethylene, polypropylene, polyamide, polyurethane and polyacrylonitrile.

Preferably the carrier is a non-woven fabric.

Preferably the thickness range of the carrier is less than 1 mm.

Preferably the carrier has two opposite surfaces and the cathode active material is formed on both surfaces of the carrier.

Preferably the cathode active material is formed on the carrier by means of slurry method.

Preferably the conductive film is a thermoplastic polymer.

Preferably the conductive film is bonded to the cathode current collector by means of hot pressing, vacuum pumping or spraying.

Preferably the cathode plate is bonded to the combined current collector by means of hot pressing or bonding.

Preferably the cathode active material has a spinel structure, layered structure or an olivine structure.

Preferably the cathode current collector is selected from at least one of glassy carbon, graphite foil, graphite sheet, carbon cloth, carbon felt, carbon fibers, or Al, Fe, Cu, Pb, Ti, Mo, Co, Ag or passivated metal thereof or stainless steel, carbon steel, Al alloy, Ni alloy, Ti alloy, Cu alloy, Co alloy, Ti—Pt alloy, Pt—Rh alloy or passivated alloy thereof.

Preferably the battery further comprises a separator which is retaining the electrolyte.

Preferably the anode and/or the electrolyte further comprise an additive which is a bismuth compound.

Preferably the bismuth compound is selected from bismuth trioxide and/or bismuth nitrate.

Preferably the weight percentage range of the bismuth compound in the electrolyte is 0.01-5%.

Preferably the weight percentage range of the bismuth compound in the anode is 0.1-10%.

Preferably the anions of the electrolyte include alkyl sulfonate ions.

Preferably the alkyl sulfonate ions are methyl sulfonate ions.

Preferably the concentration of the alkyl sulfonate ions in the electrolyte is 0.5~12 mol/L.

Preferably the anions of the electrolyte further comprise at least one of sulfate ions, chloride ions, acetate ions and nitrate ions.

Preferably the battery further comprises an anode modifier which is selected from at least one of gelatin, agar, cellulose, cellulose ether and soluble salt thereof, dextrin and cyclodextrin.

Preferably the cyclodextrin is selected from at least one of α-cyclodextrin, β-cyclodextrin and γ-cyclodextrin; the cellulose ether is selected from carboxymethyl cellulose or hydroxypropyl methyl cellulose.

Preferably the average molecular weight of the anode modifier is 2,000 to 2,000,000.

Preferably the anode modifier is contained in a coating layer on the surface of the anode.

Preferably the coating layer further includes the second metal ions.

Preferably the thickness of the coating layer is 5~40 μm.

Preferably the weight percentage range of the anode modifier in the electrolyte is 0.01-2%.

Preferably the battery further includes a separator which is located between the cathode and the anode.

Preferably the first metal ions are selected from Li and Na ions.

Preferably the cathode active material is selected from at least one of $LiMn_2O_4$, $LiFePO_4$ or $LiCoO_2$.

Preferably the second metal ions are selected from manganese ions, iron ions, copper ions, zinc ions, chromium ions, nickel ions, tin ions or lead ions.

Preferably the solvent is an aqueous solution or alcohol solution.

Preferably the pH range of the electrolyte is 3-7.

Preferably the cathode material further comprises conductive agent graphite, wherein the particle size of the conductive agent graphite is less than 50 μm and the crystallinity of the conductive agent graphite is no less than 90%.

Preferably the graphite comprises a first graphite and a second graphite, the particle size of the first graphite is 15-50 μm and the particle size of the second graphite is 5 to 15 μm.

Preferably the weight percentage range of the first graphite and the second graphite in the graphite are 30-50% and 40-60% respectively.

Preferably the particle size d10 of graphite is 6 μm.

Preferably the particle size of graphite is greater than 0.5 μm.

Preferably the weight percentage range of the conductive agent graphite in the cathode material is 6-15%.

Preferably the cathode comprises a combined current collector and a cathode plate, the combined current collector comprises a cathode current collector and a conductive film which is coated on the cathode current collector, the cathode plate comprises a cathode material; the anode is selected from metal, alloy or carbon-based material;

The electrode plate is easy processing and sorting and has a uniform thickness and performance consistency. The battery using this electrode plate has a low price, good cycle performance and high energy. Therefore, the battery of the invention could be widely used in large-scale energy storage, power grids and other fields.

The invention also provides a battery pack which comprises a plurality of batteries provided by the present invention.

The invention also provides an uninterrupted power supply which comprises the battery provided by the present invention.

The invention also provides a vehicle, which comprises the battery provided by the invention as an engine driving power source.

BRIEF DESCRIPTION OF THE DRAWINGS

The features of the invention will become more apparent in the following detailed description in which reference is made to the appended drawing wherein.

Figure 1:
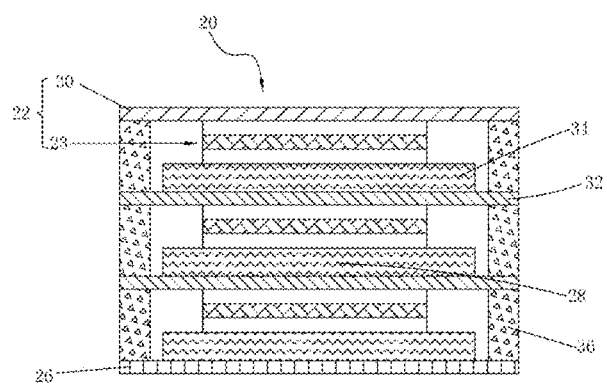
FIG. 1 schematically shows battery structure in cross section in a first embodiment.

Wherein:

| | |
|---|---|
| 1. electrode plate | 2. carrier |
| 4. active material layer | 6, 10. electode |
| 8. current collector | 12. conductive film |
| 20. battery | 22, 40. cathode |
| 23. cathode plate | 24. bipolar electrode |
| 26. anode | 28. electrolyte |
| 30. cathode current collector | 32. bipoalr current collector |
| 321. first surface | 322. second surface |
| 34. seperator | 36. seal part |
| 38, 46. battery unit | 42. cathode |
| 44. anode | 50. cathode active material |
| 100, 200, 300. battery | 400, 500, 600. battery |
| 700. battery | |

DETAILED DESCRIPTION OF THE INVENTION

The following description of the preferred embodiment(s) is merely exemplary in nature and is in no way intended to limit the invention, its application or uses.

An electrolyte for a battery comprises at least one solvent capable of dissolving solute, the solute being ionized to at least a second metal ions that can be reduced and deposited on an anode to form an anode active material, and the anode active material can be oxidized to the second metal ions dissolved in the electrolyte.

Preferably the electrolyte also comprises a solute that can be ionized to at least intercalation-deintercalation ions that can deintercalate from a cathode during the charge cycle and intercalate into the cathode during the discharge cycle.

Specifically, both the second metal ions and intercalation-deintercalation ions are metal ions. The intercalation-deintercalation ion is referred to as a first metal ion. Thus the electrolyte comprises the first metal ions and the second metal ions. During the charge cycle the second metal ions can be reduced to a second metal which is deposited on the anode, and during discharge cycle the second metal can be reversibly oxidized to the second metal ions.

The solvent is to dissolve the solute and eventually the electrolyte has cations and anions which can move freely. Preferably the solvent is an aqueous solution and/or an alcohol solution, the alcohol includes but is not limited to methanol or ethanol.

The first metal ions in the electrolyte can deintercalate from the cathode active material during the charge cycle and intercalate into the cathode active material during the discharge cycle.

Preferably the first metal ions are selected from lithium ions and sodium ions; and more preferably the first metal ions are lithium ions.

The second metal ions in the electrolyte can be reduced to a metallic state as a second metal and deposited on the anode during a charge cycle and the second metal can be oxidized from the metallic state to the second metal ions during a discharge cycle Preferably the second metal ions are selected from manganese ions, iron ions, copper ions, zinc ions, chromium ions, nickel ions, tin ions or lead ions; and more preferably the second metal ions are zinc ions.

In a preferred embodiment, the first metal ions are selected from lithium ions, while the second metal ions are selected from zinc ions, i.e. the cations of the electrolyte include lithium ions and zinc ions.

Preferably the anions of the electrolyte include alkyl sulfonate ions. The alkyl sulfonate ions include but are not limited to aliphatic sulfonate ions. The aliphatic sulfonate ions include but are not limited to that with a functional group or a substituent on the aliphatic group. Preferably the formula of the alkyl sulfonate ions is as follows:

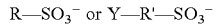

R—SO$_3^-$ or Y—R'—SO$_3^-$

Y refers to a substituent group, such as —F, —OH, etc.

R may be a branched or unbranched aliphatic group; which may be an aliphatic group with 1 to 12 carbon atoms, preferably with 1 to 6 carbon atoms, more preferably R is a methyl group, an ethyl group and n-propyl.

R' may be a branched or unbranched aliphatic group; and R' may be an aliphatic group with 2 to 12 carbon atoms, preferably with 2 to 6 carbon atoms, more preferably R' is a unbranched aliphatic group with 2 to 6 carbon atoms; more preferably the sulfonic acid group and a substituent group are not attached to the same carbon atom.

More preferably the alkyl sulfonate ions are methyl sulfonate ions, i.e., R is methyl.

The anions of Electrolyte are methyl sulfonate ion, which can further enhance the solubility of the first metal ions and the second metal ions, and of which the cost is relative lower than the other alkyl sulfonate.

Preferably the electrolyte contains only one kind of anions which are the alkyl sulfonate ions, thus the electrolyte has an excellent low-temperature properties and higher concentration of the first metal ions and the second metal ions.

More preferably the solutes of the electrolyte are alkyl sulfonate zinc and alkyl sulfonate lithium.

Of course, the electrolyte may also comprise the other anions besides alkyl sulfonate ions. The other anions can be any kind that does not affect the electrochemical reaction in cathode and anode, and the dissolution of alkyl sulfonate in solvent. For example, the other anions may be sulfate ions, chloride ions, nitrate ions, acetate ions, formate ions, phosphate ions and mixtures thereof.

In a preferred embodiment, the electrolyte further comprises at least one of sulfate ions, chloride ions, acetate ions and nitrate ions.

More preferably the molar ratio of sulfate ions and alkyl sulfonate ions is 1:21 to 27:7.

More preferably the electrolyte comprises alkyl sulfonate ions and sulfate ions.

The concentration of ions in the electrolyte can be regulated through the type of solute and solvent and the application fields of battery.

Preferably the concentration of the first metal ions in the electrolyte is 1~7 mol/L.

Preferably the concentration of the second metal ions in the electrolyte is 1~4 mol/L.

Preferably the concentration of the alkyl sulfonate ions in the electrolyte is 0.5~12 mol/L.

In order to make battery's performance more excellent, the electrolyte preferably further comprises an electrolyte additive.

In a preferred embodiment, the electrolyte additive is a bismuth compound.

The methods of adding a bismuth compound to the electrolyte can be varied, depending on the electrolyte or separator. The methods include but are not limited to adding a bismuth compound into the electrolyte directly, or adding a suspension with a bismuth compound to the separator. More preferably a bismuth compound is added directly to the electrolyte, and then the electrolyte is dropped to the separator.

Preferably the bismuth compound is selected from bismuth trioxide and/or bismuth nitrate.

The amount of the bismuth compound in the electrolyte is preferably as follows:

When the electrolyte additive is a bismuth trioxide, the bismuth trioxide is 0.01 to 5% by weight of the total electrolyte.

When the electrolyte additive is a bismuth nitrate, the bismuth nitrate is 0.01 to 5% by weight of the total electrolyte.

Of course, the electrolyte additive can be a mixture of bismuth trioxide and bismuth nitrate.

Preferably the electrolyte further comprises an anode modifier; the anode modifier is selected from at least one of gelatin, agar, cellulose, cellulose ether and soluble salt thereof, dextrin and cyclodextrin.

The anode modifier aims to improve the deposition of the second metal on the anode and suppress dendrite generation of the second metal, thereby improve the safety performance of battery.

Preferably the average molecular weight of the anode modifier is 2,000 to 2,000,000.

Among them, gelatin is generally comprises a partially hydrolyzed collagen which is contained in animal bones or skins.

Preferably the average molecular weight of gelatin is 2,000 to 150,000.

The agar refers to a colloidal substance made by certain seaweed; the main component of the agar is polygalactose.

The cellulose refers to a linear macromolecule polysaccharide which is formed by more than 300 glucose units being connected through β-1,4 glycosidic bonds. The molecular formula of cellulose is $(C_6H_{10}O_5)_n$. The cellulose includes, but is not limited to α-cellulose, β-cellulose, and γ-cellulose.

Preferably, the average molecular weight of cellulose is 500,000 to 2,000,000.

Cellulose ether and soluble salt thereof refer to a derivative of cellulose in which the hydrogen of hydroxyl is substituted by alkyl. such as methyl cellulose and its soluble salt, hydroxyethyl cellulose and its soluble salt, carboxymethylcellulose and its soluble salt, ethylcellulose and its soluble salt, benzyl cellulose and its soluble salt, hydroxyethyl cellulose and its soluble salt, hydroxypropylmethyl cellulose and its soluble salt, cyanoethyl cellulose and its soluble salt, benzyl cyanoethyl cellulose and its soluble salt, carboxymethyl hydroxyethyl cellulose and its soluble salts, phenyl cellulose and its soluble salt.

Preferably the cellulose ether is selected from carboxymethyl cellulose (CMC) or hydroxypropylmethyl cellulose (HPMC).

More preferably carboxymethyl cellulose has a degree of substitution in the range of 0.8 to 1.1.

Dextrin is a sugar obtained by partially hydrolyzing starch under acid, heat or amylase, of which the molecular mass is much less than starch. Dextrin includes but is not limited to white dextrin, yellow dextrin or British gum.

Cyclodextrin is a general term for a series of cyclic oligosaccharide which are generated from amylase under the action of cyclodextrin glycosyltransferase, which usually contains 6 to 12 D-glucopyranose units. For example, cyclodextrin is α-cyclodextrin (six glucose units), β-cyclodextrin (7 glucose units) and γ-cyclodextrin (eight glucose units).

Preferably the cyclodextrin is selected from at least one of α-cyclodextrin, β-cyclodextrin and γ-cyclodextrin.

Specifically the anode modifier is dispersed in the electrolyte of a battery.

When an anode modifier is dispersed in the electrolyte, the formed dispersion could be a liquid solution or a colloidal solution based on the kind of the anode modifier.

Preferably the anode modifier is 0.01 to 2% by weight of the total electrolyte.

The way to disperse an anode modifier in the electrolyte could be adding an anode modifier directly to the electrolyte, or adding an anode modifier and the solute to a solvent to get an electrolyte.

In order to enhance a particular performance of battery (such as low temperature performance, high temperature performance, rate discharge performance, etc.), or make battery suitable for different applications, the electrolyte of the present invention may also contains other additives, such as low temperature additives, high temperature additives, overcharge additives, etc.

In order to optimize the performance of a battery, the pH range of the electrolyte is preferably 3-7, which ensure the concentration of the second metal ions in the electrolyte and avoid co-embedment of protons. Then a battery with the electrolyte in the present invention has a high capacity and rate discharge performance.

The Electrolyte of the present invention containing alkyl sulfonate ions has the following advantages: Firstly, alkyl sulfonate ions can improve the solubility of the first metal ions (e.g., lithium ion) and the second metal ions (e.g. zinc ions) in the electrolyte, the increasing of ions concentration in the electrolyte can effectively improve high rate charge and discharge performance of battery; secondly, alkyl sulfonate ions can suppress gas generation; Thirdly, alkyl sulfonate ions can also effectively reduce the self-discharge rate of battery; the reasons therein may be alkyl sulfonate ions can improve the oxygen evolution overpotential of the electrolyte and reduce the oxidation-reduction potential of cathode active material; fourthly, compared to other anionic salt, the electrolyte with alkyl sulfonate ions cannot be frozen at −20° C., which make a battery have a better low temperature performance.

The method of preparing the electrolyte depends on actual situation. The preferable method is as follows.

Method I: Alkyl Sulfonate is Directly Dissolved in a Solvent.

Appropriate amount of methyl sulfonic acid lithium and methyl sulfonic acid zinc are weighed and dissolved in water according to the desired ions concentration. The resulting solution is stirred and an electrolyte is obtained. In the electrolyte, the anions are methyl sulfonate ions, and the cations are zinc ions and lithium ions.

Method II: Metal Reacts with Alkyl Sulfonic Acid

Appropriate amount of metal zinc is weighed and dissolved in methyl sulfonic acid with certain concentration, stirred until completely dissolved; then lithium hydroxide is added and stirred until completely dissolved, at last an electrolyte is obtained. Methyl sulfonic acid completely reacts with metal zinc and lithium hydroxide; metal zinc is reduced to zinc ions in the electrolyte, lithium hydroxide reacts with methyl sulfonic acid to form methyl sulfonic acid lithium.

Method III: Metal Oxide Reacts with Alkyl Sulfonic Acid

Appropriate amount of zinc oxide is weighed and dissolved in methyl sulfonic acid with certain concentration, stirred until completely dissolved; then lithium hydroxide is added and stirred until completely dissolved, at last an electrolyte is obtained. Methyl sulfonic acid completely reacts with zinc oxide and lithium hydroxide; zinc oxide reacts with methyl sulfonic acid to form methyl sulfonic acid zinc, and lithium hydroxide reacts with methyl sulfonic acid to form methyl sulfonic acid lithium.

Method IV: Metal Carbonate Reacts with Alkyl Sulfonic Acid

Appropriate amount of zinc carbonate is weighed and dissolved in methyl sulfonic acid with certain concentration, stirred until completely dissolved; then lithium hydroxide is added and stirred until completely dissolved, at last an electrolyte is obtained. Methyl sulfonic acid completely reacts with zinc carbonate and lithium hydroxide; zinc carbonate reacts with methyl sulfonic acid to form methyl sulfonic acid zinc, and lithium hydroxide reacts with methyl sulfonic acid to form methyl sulfonic acid lithium.

A battery could be obtained by applying the electrolyte as described above.

The battery comprises a cathode, an anode and an electrolyte; the cathode comprises a cathode material, the cathode material comprises a cathode active material which is capable of reversibly intercalating-deintercalating the first metal ions; the electrolyte is as described above.

The working principle of the battery may be summarized as follows: during the charging process, the first metal ions in the cathode active material deintercalate into the electrolyte, while, the second metal ions in the electrolyte are simultaneously reduced and deposited onto the anode as a second metal. During the discharging process, the second metal is oxidized to the second metal ions and existed in the electrolyte, the first metal ions in the electrolyte intercalate into the cathode active material.

The cathode active material participates in the cathode reaction which is capable of reversibly intercalating-deintercalating the first metal ions.

Preferably the cathode active material is capable of reversibly intercalating and deintercalating lithium ions, or sodium ions.

Specifically, the cathode active material has a spinel structure, layered structure, or an olivine structure.

The cathode active material which is capable of intercalating and deintercalating Li ions may comprise a spinel structure compound having the general formula $Li_{1+x}Mn_yM_zO_k$, wherein $-1 \leq x \leq 0.5$, $1 \leq y \leq 2.5$, $0 \leq z \leq 0.5$ and $3 \leq k \leq 6$. M is selected from at least one of the following: Na, Li, Co, Mg, Ti, Cr, V, Zn, Zr, Si and Al. Preferably the cathode active material is $LiMn_2O_4$. More preferably the cathode active material is $LiMn_2O_4$ that has been doped, coated, or modified.

The cathode active material which is capable of intercalating and deintercalating Li ions may comprise a layered structure compound having the general formula $Li_{1+x}M_yM'_zM''_cO_{2+n}$, wherein $-1 \leq x \leq 0.5$, $0 \leq y \leq 1$, $0 \leq z \leq 1$, $0 \leq c \leq 1$ and $-0.2 \leq n \leq 0.2$. M, M' and M'' are selected from at least one of the following: Ni, Mn, Co, Mg, Ti, Cr, V, Zn, Zr, Si and Al. According to one embodiment, the cathode active material comprises $LiCoO_2$.

The cathode active material which is capable of intercalating and deintercalating Li ions may comprise an olivine structure compound having the general formula $Li_xM_{1-y}M'_y(X'O_4)_n$, wherein $0 < x \leq 2$, $0 \leq y \leq 0.6$ and $1 \leq n \leq 1.5$. M is selected from Fe, Mn, V, and Co. M' is selected from at least one of Mg, Ti, Cr, V and Al. X' is selected from at least one of S, P and Si. According to one embodiment, the cathode active material comprises $LiFePO_4$.

In the current lithium battery industry, almost all cathode materials are doped, coated or modified by various methods. However these modifications may make the chemical formula of the material more complex. For example, $LiMn_2O_4$ is no longer able to represent the general formula of a "lithium manganese oxide" that is widely used. Strictly speaking, the formula $LiMn_2O_4$ should include the spinel structure cathode materials of a variety of modifications and be consistent with the general formula $Li_{1+x}Mn_yM_zO_k$. Similarly the chemical formula of $LiCoO_2$ and $LiFePO_4$ described herein will be understood to include the materials of a variety of modifications and to be consistent with the general formula $Li_xM_{1-y}M'_y(XO_4)_n$ and $Li_{1+x}M_yM'_zM''_cO_{2+n}$.

When the cathode active material is a lithium ion intercalation-deintercalation compound, it can be selected from $LiMn_2O_4$, $LiFePO_4$, $LiCoO_2$, $LiM_xPO_4$, $LiM_xSiO_y$ (where M is a metal with a variable valence) and other compounds. When the cathode active material is a sodium ion intercalation-deintercalation compound, it can be $NaVPO_4F$.

When preparing a cathode slurry, a conductive agent and binder should be added.

The conductive agent is selected from at least one of a conductive polymer, active carbon, graphene, carbon black, graphite, carbon fibre, metal fibre, metal powder or metal sheet. The aim to use the conductive agent here is to reduce the overall resistance of the cathode and enhance the conductive path of the cathode material particles.

Preferably the conductive agent is graphite. To ensure graphite with conductivity and stability and suppress corrosion of graphite during charging process of battery, the particle size of graphite is a key factor.

It is found that the smaller particle size makes the graphite with the better conductive properties, but the poorer stability and corrosion resistance; the larger particle size makes the cathode material with the poorer conductive properties and higher internal resistance, which result in a bad cycle life of battery. In the present invention, the particle size of the conductive agent graphite is less than 50 µm. The conductive agent has a good conductivity and corrosion resistance.

Preferably the crystallinity of the conductive agent graphite is no less than 90% to ensure the graphite with an excellent thermal stability and corrosion resistance.

Preferably the graphite comprises first graphite and second graphite, the first graphite ranges in particle size from 15 to 50 µm and the second graphite ranges in particle size from 5 to 15 µm.

Graphite with different size in a certain proportion can greatly improve the conductivity, rate capability and corrosion resistance of the conductive agent, while suppress self-discharge of the battery.

Graphite with small particle size can effectively increase the contact area between the cathode active material and the conductive agent graphite, which improves microscopic interface conductivity of the cathode active material and the conductive agent graphite and enhances compaction density and conductivity of the cathode materials. Graphite with large particle size has a good corrosion resistance and builds a solid and continuous conductive network. Thus during charging process or float charging process, the collapse of the conductive network and consumption of the conductive agent could be avoided and the cycle life of the battery could be significantly enhanced. Preferably the particle size of the conductive agent graphite is greater than 0.5 µm.

The first graphite with a particle size of 15-50 µm is in the range of 30-50% by weight; the second graphite with a particle size of 5-15 µm is in the range of 40-60% by weight; the remaining is a graphite with a smaller particle size of 0.5-5 µm. Graphite with different size in a certain proportion builds a conductive network with large contact area and good corrosion resistance, which results in reduction of internal resistance, self-discharge of the cathode active material and improvement of the battery float charge life.

Preferably the particle size d10 of graphite is 6 µm. Controlling the content of graphite with small particle size could enable graphite of better stability and corrosion resistance.

The addition of the conductive agent must reach a certain amount to form a conductive network. Then voids in the structure of the cathode active material are filled in with the conductive agent particles and there will be effective contact between the conductive agent and the cathode active material and between the conductive agent and the conductive agent.

The content of the conductive agent is important; this may help the cathode active material make full contact with the conductive agent graphite particles to full contact and enable the interfacial electrochemical reaction resistance to reach a stable value and increase the stability of the cathode. Too much content of the conductive agent will result in the low content of the cathode active material in unit volume of the cathode. The density decrease in the cathode active material will results in decrease in the battery capacity. Too less content of the will results in the less electronically conductive path in the cathode active material; this may cause low utilization of the cathode active material, low cathode capacity and poor cycle life of the battery.

To ensure that the cathode material has an excellent electrical conductivity and high capacity, preferably the weight percentage of the conductive agent graphite in the cathode material is 6-15%.

The binder is selected from one of polyethylene oxide, polypropylene oxide, polyacrylonitrile, polyimides, polyesters, polyethers, fluorinated polymers, polydivinyl polyethylene glycol, polyethylene glycol diacrylate, polyethylene glycol dimethacrylate and a combination thereof and derivatives. Preferably the binder is polytetrafluoroethylene (PTFE), polyvinylidene fluoride (PVDF) or styrene butadiene rubber (SBR).

In the present invention, it should be understood that the cathode plate comprises the cathode active material, but not a cathode current collector. In prior art the usual method to prepare cathode is to coat slurry with a cathode active material on a cathode current collector in a certain way and dry into a cathode. In this process the whole cathode can only be weighed when sorting cathode. Concerning uneven distribution of weight of cathode current collector, the weight of cathode active material cannot be accurately measured, thus cathode capacity will be different and battery consistency and qualification rate will be affected. The cathode plate could be prepared separately from cathode current collector, which enables cathode active material to be weighed solely. Thus the battery consistency is greatly improved and the battery is easily assembled.

The cathode active material participates in electrochemical reaction. The weight percentage of the cathode active material in the cathode plate is 60-99%. In order to make the cathode have a high capacity, the surface density range of the cathode active material in the cathode plate is 200-2000 $g/m^2$.

In one embodiment, the cathode plate also comprises a carrier which is electrochemically inert. The cathode active material is formed on the carrier. The carrier has two opposite surfaces. Without limited, the cathode active material is formed on both surfaces of the carrier or the cathode active material is formed on one surface of the carrier.

Method of preparing the cathode plate is not particularly limited, and in one embodiment, the method of preparing the cathode plate comprises the following steps: preparing slurry containing a cathode active material, and then forming the slurry on the carrier. The cathode active material is formed on the carrier by slurry method.

The role of the carrier which is electrochemically inert is to bear the cathode active material. As known to person in art, the electrochemically inert carrier does not participate in any electrochemical reaction which is only in the presence of the cathode plate to bear the cathode active material.

In one embodiment, the carrier has a porous structure and is electrical insulation. The pore size range of the carrier is 50 meshes to 200 meshes, which ensure that the carrier has a certain mechanical properties, the cathode active material could adhere to the carrier and peeling resistance force of the cathode active material and the carrier is improved. Thus the cathode plate could stably works in the battery and it is easy for ions transporting in the cathode active material.

In another embodiment, the carrier may conduct electron. The material of the carrier comprises, but is not limited to, conductive resin or metal.

Thickness of the carrier is not particularly limited, and in order to ensure that the cathode plate has high energy density, the thickness of the cathode plate should be controlled. Particularly the thickness range of the cathode plate is 0.3~1.5 mm and the thickness range of the carrier is less than 1 mm.

The carrier may be a non-woven fabric. The non-woven fabric is processed by physical adhesive method without textile processing. The composition of the non-woven fabric is not particularly limited except for electrochemically inert. Non-woven fabric is low weight, stable performance, easy finalizing design and low cost. In the present invention, the application of non-woven fabric in combination with the cathode active material in the cathode plate could enable that the cathode plate has a lower weight and more stable electrochemical performance.

The material of the carrier may be selected from at least one of polyethylene terephthalate (PET), polybutylene terephthalate (PBT), polyethylene (PE), polypropylene (PP), polyamide (PA), polyurethane (PU) and polyacrylonitrile (PAN). These materials can be stably present in the cathode plate without participating in the electrochemical reaction, thus the battery has a high energy density output and low weight.

In prior art the usual method to prepare cathode is to coat slurry with active material on a current collector. For example, in lithium ion battery the slurry containing graphite is coated on a copper foil to form an anode; in lead-acid batteries the lead paste is coated on grid to form an anode. In this process the whole electrode can only be weighed when sorting cathode. Concerning uneven distribution of weight of cathode current collector, the weight of cathode active material cannot be accurately measured, thus cathode capacity will be different and the battery consistency and qualification rate will be affected. In the present invention, the ratio of the cathode active material, a binder and a conductive agent in the cathode plate is accurate and consistent, and the electrochemically inert carrier is a material with high consistency, thus the weight consistency of the cathode plate is very high.

The cathode further comprises a cathode current collector to bear the cathode active material. The material of the cathode current collector is selected from one of carbon-based material, metal or alloy.

The cathode current collector is to conduct and collect electron and does not participate in the electrochemical reaction. Within the working voltage range of the battery, the cathode current collector can be stably present in the electrolyte without occurring side reaction, which ensures that the battery has a stable cycle performance.

The cathode current collector needs to meet requirement of large surface area and good mechanical properties. The cathode current collector is preferably treated by passivating, punching, grinding or weak acid corrosion treatment. The cathode current collector has a large specific surface area after being treated, which may improve compound degree of the cathode current collector and a conductive film and reduce the contact resistance of the cathode plate and combined current collector.

The main purpose of passivating the cathode current collector is to form a passivated oxide film thereon, so that the cathode current collector does not participate in electrochemical reaction during the process of battery charging and discharging. This ensures the stability of the battery. The method includes chemical or electrochemical passivation.

Chemical passivation includes oxidization by an oxidizing agent. The oxidizing agent should satisfy the requirement of making the current collector form a passivation film without dissolving the current collector. The oxidizing agent is selected from but not limited to concentrated nitric acid and ceric sulphate ($Ce(SO_4)_2$).

Specifically the process of chemical passivation includes the following steps: putting current collector in the oxidizing agent, maintaining for 0.5-1 hours for formation of a passivation film and then cleaning and drying the current collector.

The process of electrochemical passivation includes the following steps: charging and discharging of the current collector or battery with a current collector to form a passivation film thereon.

The current collector can be pre-passivated before battery assembly. According to one embodiment, the current collector serves as a working electrode charged and discharged in a three electrode system with proper reference electrode and counter electrode. The voltage for oxidizing the cathode current collector is 2.1-2.4V. The cathode current collector can be a metal, such as aluminum or an alloy (e.g. stainless steel or aluminum alloy). Of course, a two electrode system could be utilized for passivation with the voltage for oxidizing the cathode current collector at 2.1-2.4V.

The current collector can be passivated after battery assembly. The cut-off voltage of charging and discharging are 2.1-2.4 V and 1.35-1.45V, the battery is charged and discharged no less than once.

The thickness of the cathode current collector has a certain effect on electrochemical properties of the cathode. Thin thickness will affect the mechanical strength of the cathode current collector; thick thickness will increase the weight of the cathode and affect the energy density of the cathode. In the present invention the thickness of the cathode current collector is preferably 10 μm-100 μm to make the battery have a high energy density output.

Preferably a combined current collector is applied in the cathode. The combined current collector further comprises a conductive film coated on the cathode current collector. The conductive film should comply with the following requirements: stable and insoluble in the electrolyte, no swelling, no oxidization in high voltage, easy to process into a dense, impermeable and electrically conductive film. On the one hand, the conductive film could protect the cathode current collector from being corroded by the electrolyte. On the other hand, it helps to reduce the contact resistance between the cathode current collector and the cathode plate and improve the battery energy.

In order to enable most effective use of the conductive film, the thickness of the conductive film need to be controlled. The conductive film with thin thickness is easily damaged and penetrated by the electrolyte and with bad uniformity; the conductive film with thick thickness may affect its conductivity. Preferably the thickness of the conductive film is 10 μm-2 mm, thus the conductive film is able to effectively protect the cathode current collector, reduce the contact resistance between the cathode plate the cathode current collector and improve the battery energy.

The cathode current collector has two opposite sides. Preferably both sides of the cathode current collector are coated with the conductive film.

The conductive film comprises a polymer as essential component. The weight percentage of polymer in the conductive film is 50 to 95%. Preferably the polymer is selected from thermoplastic polymer. There are two possible ways to make the conductive film conductive: (1) the polymer is a conductive polymer; (2) the conductive film further comprises conductive filler.

The material of conductive polymer should be conductive and electrochemically inert. Specifically the conductive polymer includes, but are not limited to, polyacetylene, polypyrrole, polythiophene, polyphenylene sulfide, polyaniline, polyacrylonitrile, polyquinoline, polyparaphenylene and mixtures thereof. The conductive polymer itself could be conductive, and the conductive polymer could be doped or modified to further improve its conductivity. The conductive polymer is preferably polyaniline, polypyrrole, polythiophene and polyacetylene in view of conductivity and stability.

The material of the conductive filler should satisfy the requirements of small surface area, difficult oxidation, high crystallinity, good conductivity but electrochemically inert.

The material of the conductive filler includes, but is not limited to conductive polymer, carbon based materials or metal oxides. The weight percentage of the conductive filler in the conductive film is 5 to 50%. The average particle size of the conductive filler is not particularly limited, usually in the range of 100 nm to 100 nm.

Preferably the conductive filler is a carbon-based material. The shape or mechanical property of the carbon-based material is not specifically limited, for example, the carbon-based material is selected from one of graphite, carbon nanotubes or amorphous carbon. Amorphous carbon includes but is not limited to activated carbon and carbon black. The carbon-based material is preferably carbon black and graphite, which has a large potential window, thus the carbon-based material can be stable and of high conductivity within a wide range of the cathode and anode electric potential. Metal oxides includes but is not limited to lead oxide and tin oxide.

When the conductive film comprises the conductive filler, the polymer of the conductive film preferably comprises a non-conductive polymer which plays a role in combining the conductive filler. The non-conductive polymer could enhances the binding of electrically conductive filler, improves the reliability of the battery. Preferably the non-conductive polymer is a thermoplastic polymer.

The thermoplastic polymer includes, but is not limited to polyolefin such as at least one of polyethylene, polypropylene, polybutene, polyvinyl chloride, polystyrene, polyamide, polycarbonate, polymethyl methacrylate, polyoxymethylene, polyphenylene ether, polysulfone, polyether sulfone, styrene-butadiene rubber and polyvinylidene fluoride, wherein the thermoplastic polymer preferably is polyolefin, polyvinylidene fluoride or polyamide. These polymers are easily melted to compound together with the cathode current collector and the cathode plate. In addition, these polymers have a large potential window, so that the cathode can be more stable and the battery has a low weight and high density output.

The conductive film can be formed by means of preparing a slurry containing the thermoplastic polymer, coating and solidifying the slurry. Of course the conductive filler can be included in the slurry. Specifically speaking, the thermoplastic polymer monomer and the conductive filler are mixed in a certain composite mode to obtain a conductive film with conductivity, such as dispersion composite mode, hierarchy composite mode. The thermoplastic polymer monomer is a small molecule, the conductive filler can be well dispersed in the thermoplastic polymer monomer, and then under initiator the thermoplastic polymer monomer occur polymerization reaction to obtain a conductive film.

The conductive film is coupled to the cathode current collector by hot pressing, vacuum pumping or spraying.

Hot pressing is to heat a polymer contained in the conductive film under temperature which is higher than the glass transition temperature of the polymer. The polymer is softened and can be adhered to the cathode current collector under a certain pressure. The pressure is to make the binding closely between the conductive film and the cathode current collector.

In one embodiment of vacuum pumping, the conductive film is produced to a trilateral sealed bag with a predetermined size, then cut a good positive current collector placed on the conductive film bag, by vacuuming, sealing a way that the conductive film close coated on the cathode current collector.

In one embodiment of spraying, slurry containing a thermoplastic polymer is prepared, and then the slurry is evenly sprayed on a cathode current collector, cooled and solidified. And then the cathode current collector is coated with a layer of conductive film.

In prior art the usual way to prepare an electrode comprises the following steps: coating a slurry containing an electrode active material on a current collector in a certain way. The present invention provides a battery, in the preparation of the cathode, the cathode plate may be coupled to the combined current collector by hot pressing or binding, thus the preparation of the battery can be simplified and production efficiency can be improved. The conductive film formed between the cathode plate and the cathode current collector could reduce the contact internal resistance between the cathode plate and the cathode current collector. The battery has a good consistency.

The second metal ion and the second metal participate in electrochemical reaction in the anode of the battery. The second metal can be oxidized to the second metal ion and the second metal ion can be reversibly reduced and deposited as the second metal.

Preferably the anode also comprises an anode additive which includes a bismuth compound. The way of addition of the bismuth compound to the anode depends on the anode, which may be selected from physical method and chemical method. The physical method includes but is not limited to a suspension coating method, vacuum deposition, magnetron sputtering; the chemical method included electrochemical plating.

In a first preferred embodiment, the anode is an anode current collector which serves as a carrier of electronic conduction and collection but does not participate in the electrochemical reaction. In this embodiment, a bismuth compound is added to the anode by means of dispersing a bismuth compound to a dispersant, the resulted dispersion being coated on the anode current collector, and then removing the dispersant.

The material of the anode current collector may comprise at least one metal selected from Ni, Cu, Ag, Pb, Mn, Sn, Fe, Al or a passivated metal thereof, or silicon or a carbon based material. The carbon based material includes graphite materials, such as commercial graphite pressed foil, wherein graphite weight rate is in the range 90-100%. The material of the anode current collector can be stainless steel or passivated stainless steel. Similarly the mode of stainless steel can be but is not limited to 300 series stainless steel, such as stainless steel 304, 316 or 316 L.

In addition, the material of the anode current collector can be selected from a metal with an electroplating layer or coating layer of high hydrogen potential, which is selected at least one of C, Sn, In, Ag, Pb, Co, or an alloy or oxide thereof. The thickness range of the electroplating layer or coating layer is 1-1000 nm, such as copper or graphite foil coated with tin, lead or silver.

In a second preferred embodiment, the anode comprises an anode current collector and an anode active material.

The anode active material is the second metal. Preferably the anode active material is selected from one of Zn, Ni, Fe, Cr, Cu, Mn, Sn or Pb.

If the second metal ion in the electrolyte is $Zn^{2+}$, the corresponding anode active material is metal Zn. For example, the anode comprises brass foil and zinc foil, brass foil serves as the anode current collector, zinc foil serves as the anode active material which participates in the anode reaction.

The anode current collector is as described in the first preferred embodiment.

The second metal is in form of sheet or powder.

When a second metal sheet is used as the anode active material, the second metal sheet and the anode current collector form a composite layer.

In this case, the method of adding a bismuth compound to the anode includes but is not limited to the following steps: dispersing the bismuth compound to a dispersant, the resulted dispersion being coated on the second metal sheet, and finally removing the dispersant.

When a second metal powder is used as the anode active material, the method of adding a bismuth compound to the anode includes but is not limited to the following steps: mixing the bismuth compound and the second metal powder to prepare a slurry, then the slurry being coated on the anode current collector to form an anode.

When preparing an anode, except for the anode active material (i.e. the second metal powder) an anode conductive agent and anode binder could be added to enhance the performance of the anode.

In a third preferred embodiment, the second metal sheet is used as the anode, which serves as an anode current collector and anode active material.

In this case, the method of adding a bismuth compound to the anode includes but is not limited to the following steps: dispersing the bismuth compound to a dispersant, the resulted dispersion being coated on the second metal sheet, and finally removing the dispersant.

Of course, a bismuth compound can be added to the anode and the electrolyte in order to make the battery performance more excellent.

Preferably the bismuth compound is selected from bismuth trioxide and/or bismuth nitrate.

Preferably the amount of a bismuth compound in the anode is as follows:

When bismuth trioxide is used alone, the weight percentage of bismuth trioxide in the anode is 0.1 to 10%.

When bismuth nitrate is used alone, the weight percentage of bismuth nitrate in the anode is 0.1 to 10%.

Of course a mixture of bismuth trioxide and bismuth nitrate can both used.

Preferably the anode may also comprise an anode modifier. The anode modifier is attached to the anode surface, which is different from the electrolyte. When the anode modifier is attached to the surface of the anode, the anode modifier is preferably coated on the surface of the anode to form a coating layer, i.e., the negative modifier is included in the coating layer. Specifically speaking the coating method is as following: dispersing the anode modifier to dispersion, the resulted dispersion being coated directly on the surface of the anode, and then drying.

Preferably the weight percentage of the anode modifier in the dispersion is less than 20%, which makes coating operation easy and improves the coating effect.

Preferably the thickness of the coating layer is 5-40 μm, which can effectively void the reduction of the ion transport efficiency.

More preferably the coating layer further comprises the second metal ion, namely, the anode modifier and the second metal ion salt are together coated on the anode surface. Specifically speaking, the anode modifier and the second metal ion salt are dispersed in a dispersant to form a dispersion, which is coated on the surface of the anode and dried thereafter.

The addition of the second metal ion in the coating layer can effectively improve the conductivity of the second metal ion. When the coating layer comprises a second metal ion, the thickness of the coating layer is preferably 20-1000 µm.

The attachment of the anode modifier to the anode surface could effectively inhibit the generation of dendrites, enhance the safety performance of the battery, improve the cycle performance of the battery, suppress the side reaction between the electrolyte and the anode and avoid the anode gas production.

A separator can be excluded in the battery. Of course considering the safety performance of the battery, a separator is preferably configured between the cathode and the anode. The separator could avoid short circuit of cathode and anode caused by other unforeseen factors.

Separator has no special requirements, as long as it allows the electrolyte passing and is electron insulation. Various organic lithium-ion battery separators can be useful in the present invention. The separator may also be porous ceramic separator and other material.

Bipolar Battery

The present invention also provides a battery. Particularly, the battery is an aqueous bipolar battery, which may be introduced by following specific embodiments.

Embodiment 1

FIG. 1 shows schematically the bipolar battery in a first embodiment. The battery 20 comprises a cathode 22, at least one bipolar electrode 24, an anode 26 and an electrolyte 28. The cathode 22, bipolar electrode 24 and the anode 26 are stacked, the cathode 22 and the anode 26 are located at the top layer and lowest layer, the bipolar electrode 24 and an electrolyte 28 are configured between the cathode 22 and the anode 26. Specific to FIG. 1, the battery 20 comprises two bipolar electrodes 24.

The cathode 22 comprises a cathode collector 30 and a cathode plate 23 which is formed on one surface of the cathode collector 30. The cathode plate 23 comprises a cathode active material 50 which is capable of reversibly intercalating-deintercalating a first metal ions. In embodiment 1 the cathode plate 23 further comprises an electrochemically inert carrier 2; the cathode active material 50 is formed on the carrier 2.

The cathode current collector 30, the cathode active material 50, the first metal ion and the carrier 2 may be as described previously.

Figure 2:
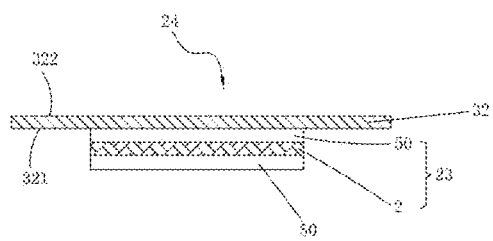
FIG. 2 schematically shows bipolar electrode structure in the first embodiment.

FIG. 2 is a schematic cross-sectional view of bipolar electrode 20. The bipolar electrode 24 comprises a bipolar current collector 32 and the cathode plate 23. The bipolar current collector 32 has two opposite surfaces which are a first surface 321 and a second surface 322, the cathode plate 23 is formed on the first surface 321. The polarity of the first surface 321 and the second surface 322 are opposite; specifically speaking the first surface 321 is served as cathode and a second surface 322 is served as anode.

The cathode plate 23 is attached to the bipolar current collector 32 through a certain way, such as laminating, pressing, bonding or hot pressing. The carrier 2 and the cathode active material 50 of the cathode plate 23 may be as described previously.

The material of the bipolar current collector 32 may be a conductive plastic; preferably the thickness range of bipolar current collector 32 is 50 to 100 µm.

The material of conductive plastic is selected from a conductive polymer, which includes but is not limited to at least one of polyacetylene, polypyrrole, polythiophene, polyphenylene sulfide, polyaniline, polyquinoline or polyphenylene. Conductive polymer itself has conductivity, but it can also be doped or modified to further improve its conductivity.

Conductive plastic may also be a compound conductive plastic which comprises a polymer as main substrate and a conductive agent. The conductivity of the compound conductive plastic is mainly realized by the conductive agent, so it is not particularly limited of the polymer that whether it is conductivity. Specifically conductive plastic comprises a polymer and a conductive agent; the polymer includes, but is not limited to at least one of polyethylene, polypropylene, polybutene, polyvinyl chloride, polystyrene, polyamide, polycarbonate, polymethyl methacrylate, polyoxymethylene, polyphenylene ether, polysulfone, polyether sulfone, styrene-butadiene rubber or fluorine resin; the polymer may be a polytetrafluoroethylene or its copolymer, such as polytetrafluoroethylene (PTFE) and styrene-butadiene rubber (SBR) copolymer.

Conductive agent includes carbon-based material, metal or metal oxide. The weight percentage range of conductive agent in the conductive plastic is 10-90%.

Carbon-based material is selected from one of graphite, carbon nanotubes and amorphous carbon. Amorphous carbon includes but is not limited to activated carbon and carbon black.

The form of metal may be metal powder, metal foil, metal wire or metal fiber. Metal oxides include, but are not limited to lead oxide and tin oxide.

Specifically the polymer and a conductive agent are processed by a certain composite mode to obtain a plastic with conductivity, such as dispersion composite mode and hierarchy composite mode.

The material of bipolar current collector 32 may also be passivated stainless steel or stainless steel. The mechanical properties of stainless steel is superior to conductive plastic, therefore, when stainless steel is used as a bipolar current collector 32, the thickness of the bipolar current collector 32 may be thinner, specifically the thickness of the bipolar current collector 32 is 20-100 µm.

Passivation treatment method of stainless steel is not limited; it may be a physical method, chemical method or electrochemical method. The main purpose of passivation is to improve the compatibility of the bipolar current collector 32 and the electrolyte 28 and reduce side reaction, which enable that the battery has a stable cycle performance.

Requirement on the mechanical properties of the bipolar current collector 32 is not restrict. A lightweight conductive plastic or a thin stainless steel may be employed as a bipolar current collector 32. Thus the overall weight of the battery 20 is reduced, and the energy density of the battery 20 could be significantly improved.

The anode 26 is selected from metal, alloy or carbon-based material.

Specifically the anode 26 comprise at least one metal selected from Zn, Ni, Cu, Ag, Pb, Mn, Sn, Fe, Al or a passivated metal thereof or an alloy containing metal thereof or graphite foil, graphite sheet, carbon cloth, carbon felt, carbon fibers or tinned copper or brass.

Specifically the anode 26 can be selected from a metal with an electroplating layer or coating layer of high hydrogen potential, which is selected at least one of C, Sn, In, Ag, Pb, Co, or an alloy or oxide thereof. The thickness range of the electroplating layer or coating layer is 1-1000 nm, such as copper or graphite foil coated with tin, lead, silver or carbon. The thickness range of the cathode current collector 30 is 1-10 mm.

The anode 26 may be as described previously, i.e., the anode 26 is served as an electron collection and conduction substrate and not involved in the electrode reaction or the anode 26 includes an anode current collector and an anode active material, such as the anode 26 comprises brass foil and zinc foil, zinc foil is the anode active material.

Electrolyte 28 is sandwiched between the cathode 22 and the anode 26. The cathode 22, the bipolar electrode 24 and the anode 26 is stacked. When the battery 20 comprises only one bipolar electrode 24, the electrolyte 22 is sandwiched between the cathode 22 and the bipolar electrode 24, and between the anode 26 and the bipolar electrode 24. When the battery 20 comprises more than one bipolar electrode 24, the electrolyte 22 is sandwiched between the cathode 22 and the adjacent bipolar electrode 24, between the adjacent bipolar electrodes 24 and between the anode 26 and the bipolar electrode 24.

Electrolyte 28 has already been described previously and no more repeated.

Preferably the battery 20 further comprises an anode additive which is added to the anode 26 and/or 28 in the electrolyte 28. The anode additive is bismuth tiroxide and/or bismuth nitrate.

Preferably the battery 20 further comprises an anode modifier which is added to the anode 26 and/or 28 in the electrolyte 28. The anode modifier is selected from at least one of gelatin, agar, cellulose, cellulose ethers and soluble salts thereof, dextrin and cyclodextrin.

Similarly the addition method of the anode additive and the anode modifier has been introduced previously, no more repeated here.

In embodiment 1 the battery 20 further includes a separator 34 to retain the electrolyte 28 and prevent the battery 20 from short circuit. The separator 34 is sandwiched between the cathode 22 and the adjacent bipolar electrode 24, between the adjacent bipolar electrodes 24 and between the anode 26 and the bipolar electrode 24.

Separator 34 may be selected from a porous membrane, non-woven fabric or glass fiber. Porous membrane includes, but is not limited to one of polyethylene (PE), polypropylene (PP), polyimide or PE-PP, PP-PE-PP laminate membrane. Non-woven fabric includes, but is not limited to rayon, cellulose acetate and nylon. The amount of electrolyte 28 retained in the separator 34 may be in the range of retention of the separator 34 or beyond the range, because the battery 20 is configured with a seal part 36 to avoid leakage of the electrolyte 28.

The seal part 36 is formed and arranged at the outer circumference part of a part of the bipolar current collector 32. Without particularly limited the seal ring may be used as the seal part 36. Preferably the seal ring is in a rectangular shape. The material of seal ring meets requirement of with an excellent sealing effect under the environment of the battery 20.

The material of the seal part 36 is a rubber which is selected from, but not limited to one of silicone rubber, fluorine rubber, alkene rubber and nitrile rubber. Alkene rubber includes, but is not limited to styrene butadiene rubber (SBR) and chloroprene rubber (CR). These rubber-based resins have a good seal ability (liquid tightness), acid and alkali resistance, chemical resistance, durability, weather resistance and heat resistance, and can maintain an excellent performance in a long-term use of the battery without deteriorating. Thus it is possible to effectively prevent the electrolyte 28 leaking from the battery 20, prevent the battery 20 from short-circuit due to the leakage of electrolyte 28 and ensure cycle stability of the battery 20.

When a seal ring is used as the seal part 36, the area of the separator 34 is smaller than the area of the sealing ring and the height of the seal ring is no less than the thickness of the separator 34 and the cathode plate 23. When assembling the battery, the separator 34 retaining the electrolyte 28 is placed in the circle of the seal ring and not involved in sealing, which could avoids the leakage of the electrolyte 28 because of using a porous membrane. Of course the area of the separator 34 may be greater than the area bounded by the seal part 36, and in this case the separator 34 and the seal part 36 are integrally formed and the electrolyte 28 cannot be leaked from the battery.

Figure 3:
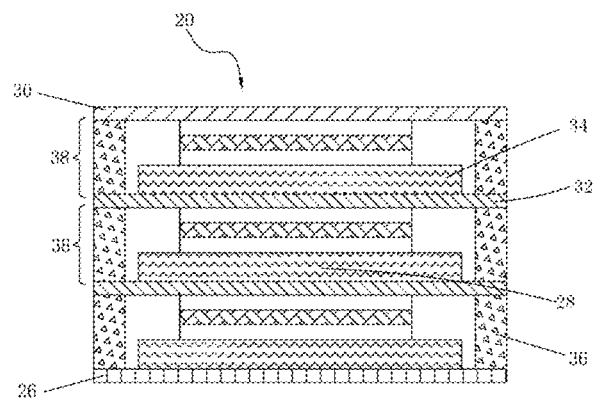
FIG. 3 schematically shows battery unit in the first embodiment.

As shown in FIG. 3, the bipolar electrodes 24 are stacked between the cathode 22 and the anode 26; electrons are export or import only from the cathode 22 and anode 26. The battery 20 comprises three battery cells 38 connected in series. Each cell 38 comprises the cathode, the anode, the electrolyte and the separator. Electrolyte 28 is sealed by the seal part 36, which avoid short-circuit between the battery cells 28 due to the leakage of the electrolyte 28 and ensure the normal operation of the battery 20.

For example, the battery cell 38 comprises the cathode current collector 30, the cathode plate 23, the separator 34, the electrolyte 28, the seal part 36 and the second surface of the bipolar electrode which is served as anode. The seal part 36 is to seal the electrolyte in each cell 38 to avoid short circuit of the battery 2 caused by leakage of electrolyte 28. The battery only comprises two bipolar electrodes 24 in FIG. 3, but in fact it can be easily to adjust the number of the bipolar electrode 20 in accordance with usage requirements to prepare a battery having different output voltage and a battery having a high output voltage. The present invention provides a battery having a wide range of uses.

The preparation process of the battery is simple. Particularly a rectangular seal ring is stacked on the outer peripheral portion of an anode; a separator retaining electrolyte is placed within the seal ring; and then a bipolar electrode and a cathode are sequentially stacked thereon. The cathode active material in the cathode and the bipolar electrode is facing to the anode and the electrolyte is sealed by the ring seal. The number of bipolar electrode determines the final output voltage of the battery; it is possible to adjust the number of bipolar electrode according to the usage requirement. The battery has a wide range of uses.

In order to prevent external shock and deterioration of the environment the laminated and sealed battery is all sealed by an encapsulating material or housing. Encapsulating material or housing material is preferably a metal material coated with a polymer, such as a metal coated with a polypropylene film. The metal includes, but is not limited to aluminum, stainless steel, nickel or copper.

Figure 4:
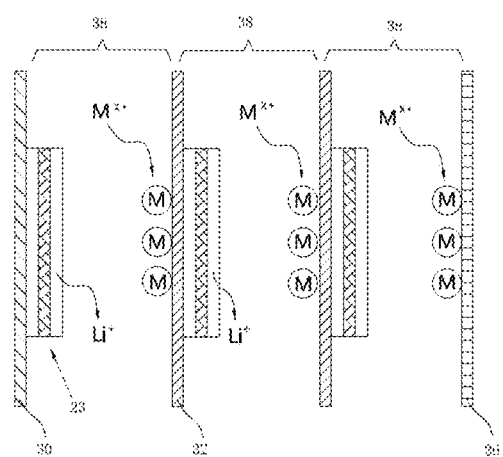
FIG. 4 schematically shows battery charging principle in the first embodiment.

As shown in FIG. 4, the working principle of the aqueous bipolar battery 20 may be summarized as follows: in a battery cell 38 during the charging process, the first metal ions in the cathode active material 50 of the cathode plate 23 deintercalate into the electrolyte, while, the second metal ions in the electrolyte are simultaneously reduced and deposited onto the second surface 322 of the bipolar current collector 32 to be an anode active material. In a battery cell 38 comprising an anode 26, the second metal ions in the electrolyte are reduced and deposited onto the anode 26. Discharge process is the reverse process.

In the present invention, the first surface 321 of the bipolar current collector 32 are formed with the cathode plate 23, the second surface 322 of the bipolar current collector 32 is served as a anode to provide a substrate for reduction and deposition of the second metal ion, the second metal ions are in the electrolyte. Comparing to a bipolar current collector in prior art of which the first face and second face are all disposed with an electrode active material, the battery provide in the present invention is more compact and has an excellent energy density and power density. In addition the battery using an aqueous electrolyte is safer and more environmentally friendly comparing to commercial lithium-ion batteries using organic electrolyte.

The bipolar battery 20 in the present invention has a plurality of battery cells 38 in series. Each cell 38 is well sealed by the seal part 36, thereby preventing a short circuit due to leakage of the electrolyte 28. Further even without a special leak-proof member or insulating member, short circuit of the battery cell 38 can be prevented. The bipolar battery 20 has excellent ion conductivity, charge and discharge characteristics. In addition, the bipolar battery has different output voltages by using different number of the bipolar electrode 24 according to the usage requirement.

Embodiment 2

Figure 5:
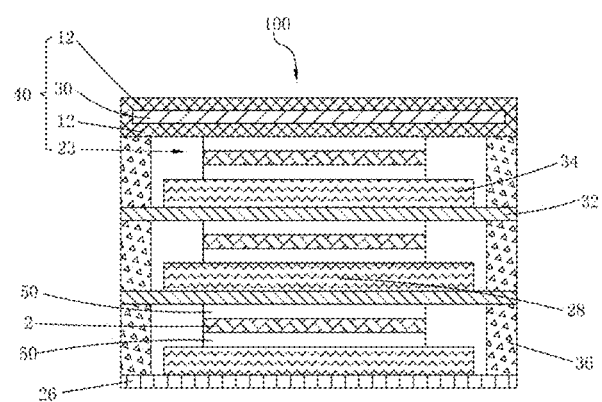
FIG. 5 schematically shows battery structure in cross section in a second embodiment.

As shown in FIG. 5, the embodiment 2 provides a battery 100 comprising the cathode 40, at least one bipolar electrode 24, the anode 26 and the electrolyte 28. Bipolar electrodes 24 are stacked between the cathode 40 and the anode 26. The cathode 40 and the anode 26 are located in the uppermost layer and the lowermost layer.

Which is different from the embodiment 1 is that the cathode 40 in embodiment 2 comprises a combined current collector and a cathode plate 23 which is formed on one surface of the combined current collector. The combined current collector comprises a cathode current collector 30 and a conductive film 12 which is coated on the cathode current collector 30.

The conductive film 12 may be coated on one or both surfaces of the cathode current collector 30 by vacuum pumping, hot pressing or spraying. The thickness of the conductive film 12 is 0.01-0.2 mm. Both surfaces of the cathode current collector 30 are coated with a conductive film 12 in FIG. 5.

Material of the conductive film 12 has also been described in detail previously and not repeated here.

On the one hand, the conductive film 12 could reduce the contact resistance between the cathode current collector 30 and the cathode plate 23; On the other hand, it helps to protect the cathode current collector 30 from being corroded by the electrolyte 28, ensure the stability of the cathode current collector 30, improve the self-discharge of the battery and make the battery have a stable cycleability.

Figure 6:
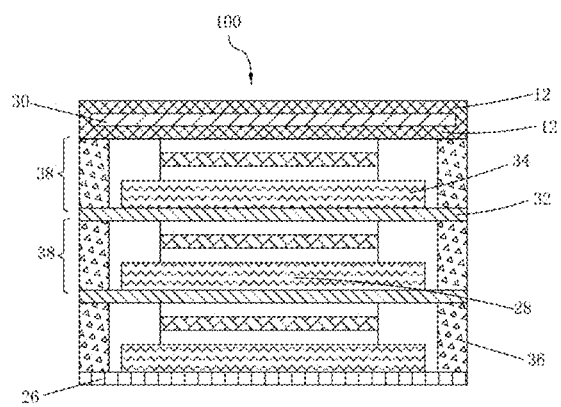
FIG. 6 schematically shows battery unit in the second embodiment.

As shown in FIG. 6, the battery unit 38 is sealed by the seal part 36 which is formed and arranged at the outer circumference part of a part of the bipolar current collector 32.

The remaining construction and assembly way of battery 100 are the same as in Embodiment 1 which may not be repeated here.

The battery 100 in embodiment 2 comprises a cathode current collector 30 coated with a conductive film 12, which prevent potential corrosion problems of cathode current collector 30 in the electrolyte 28. So the battery 100 has the characteristic of high output voltage, safety, environmental protection and stable cycleability.

Embodiment 3

Figure 7:
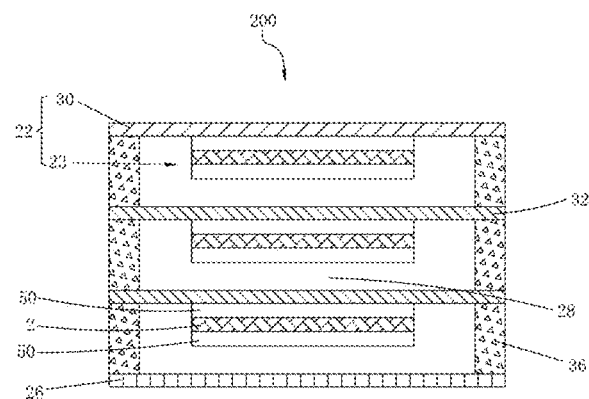
FIG. 7 schematically shows battery structure in cross section in a third embodiment.

As shown in FIG. 7, the embodiment 3 provides a battery 200 comprises the cathode 22, at least one bipolar electrode 24, the anode lead 26 and the electrolyte 28. Bipolar electrodes 24 are stacked between the cathode 22 and the anode 26. The cathode 40 and the anode 26 are located in the uppermost layer and the lowermost layer.

Which is different from the embodiment 1 is that the battery does not include a separator.

Similarly, the battery unit is sealed by the seal part 36 which is formed and arranged at the outer circumference part of a part of the bipolar current collector 32. For example, seal ring may be employed as the seal part 36. The height of the seal ring is greater than the thickness of the cathode plate 23. There are a certain distance between the cathode 22 and adjacent bipolar electrode 24, between the bipolar electrode 24 and adjacent anode 24 through the seal ring having a certain height, which could avoid short-circuit of the battery. When the number of bipolar electrode 24 is more than one, the adjacent bipolar electrodes 24 are also sealed with the seal part 36.

The preparation of the battery 200 in embodiment 3 comprises the following steps. A cathode 22, a bipolar electrode 24 and an anode 26 are stacked and sealed. Specifically the cathode plate 24 of the cathode 22 and the cathode plate 24 of the bipolar electrode 23 are arranged facing to the anode 26. A rubber material such as seal ring having a higher thickness than the cathode plate 23 could be used as the seal part 36. The seal ring is formed and arranged at the outer circumference part of a part of the bipolar current collector 32. And finally through the injection the electrolyte 28 is added.

The seal part 36 may also be a thermoplastic rubber material. In the initial sealing the thermoplastic rubber material is formed and arranged at trilateral outer circumference part of the bipolar current collector 32. After being arranged of the cathode 22, the bipolar electrode 24 and the anode 26, the thermoplastic rubber are solidified by heating or hot pressing, and then the electrolyte 28 is injected through unsealed outer circumference part of the bipolar current collector 32 and then all battery units are completely sealed.

The remaining construction and assembly way of battery 200 are the same as in Embodiment 1 which may not be repeated here.

The battery 200 in embodiment 3 does not include a separator. The battery 200 can work properly and continuously and has a lighter weight. So the battery 200 has superior energy density and specific power. In addition, in the preparation of the battery 200, it can be easily to form the seal part 36 to prevent short-circuit due to the electrolyte leakage 28. Battery 200 has excellent cycleability and cycle life.

Embodiment 4

Figure 8:
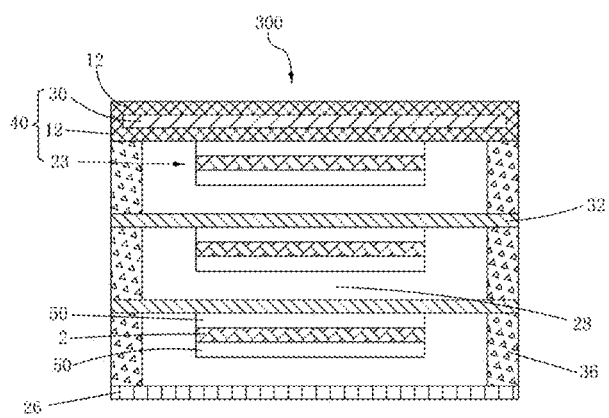
FIG. 8 schematically shows battery structure in cross section in a fourth embodiment.

As shown in FIG. 8, the embodiment 4 provides a battery 300 comprises the cathode 22, at least one bipolar electrode 24, the anode lead 26 and the electrolyte 28. Bipolar electrodes 24 are stacked between the cathode 22 and the anode 26. The cathode 40 and the anode 26 are located in the uppermost layer and the lowermost layer.

Which is different from the embodiment 1 is that the battery 300 does not include a separator.

In embodiment 4, the conductive film 12 coated on the cathode current collector 30 avoid the cathode current collector 30 in contact with the electrolyte 28, which improves the stability of the cathode current collector 30 and cycleability of the battery 300. The battery 300 without a separator is much lighter, easy to carry and has an excellent performance.

A lightweight conductive plastic or a thin stainless steel may be employed as a bipolar current collector in the present invention. Thus the battery can work normally and has a lighter weight. The battery has obvious advantages in energy density and volume. Secondly, the electrolyte used in the battery has a relatively higher ion conductivity, which improves rate performance of the battery. In the manufacturing process, according to usage requirements the battery could be altered to output different voltages. The battery is safe, environmental protection, easy to produce and used in industrial application.

The present invention provides a battery comprising at least one bipolar electrode. Only one surface of the bipolar current collector is formed with a cathode plate. The second surface of the bipolar current collector has no anode active material before the initial charge and discharge. The second metal ions in the electrolyte are deposited on the second surface of the bipolar current collector when the battery is charged. The battery using an aqueous electrolyte is much safer and environmental friendly comparing to lithium ion battery using organic electrolyte. In addition, by setting the number of bipolar electrode the battery with different output voltage or high output voltage can be prepared. The battery has a wide scope of applications and can be easily prepared.

Battery with an Internal Parallel Structure

The present invention also provides a battery. Particularly, the battery has an internal parallel structure, which may be introduced by following specific embodiments.

Embodiment 5

Figure 9:
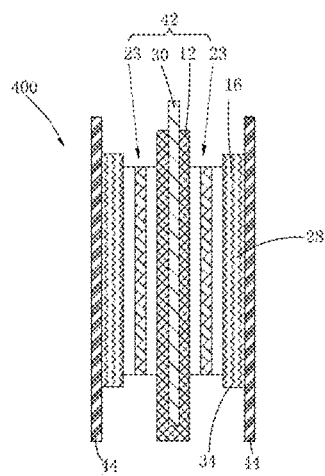
FIG. 9 schematically shows battery structure in cross section in a fifth embodiment.

As shown in FIG. 9, the embodiment 5 provides a battery 400 comprising a cathode 42, two anodes 44 and an electrolyte 28. The cathode 42 is sandwiched between two anodes 44. The electrolyte 28 is sandwiched between the cathode 42 and the anode 44.

The cathode 42 comprises a combined current collector and a cathode plate 23 which is formed on one surface of the combined current collector. The combined current collector comprises a cathode current collector 30 and a conductive film 12 which is coated on the cathode current collector 30. The cathode plate 23 comprises a cathode active material 50 which is capable of reversibly intercalating-deintercalating a first metal ions.

The combined current collector has two opposite surfaces and the cathode plates 23 are disposed on the both surfaces of the combined current collector.

The cathode plate 23 includes an electrochemically inert carrier, the cathode active material 50 is formed on the carrier, the cathode active material 50 and the carrier has been introduced previously and not repeated here.

As shown in FIG. 9, preferably both surfaces of the cathode current collector 30 are coated with conductive film 12. Then, the cathode plate 23 is coupled to the conductive film 12 of the combined current collector by means of hot pressing, bonding, laminating or pressing.

The conductive film 12 may be coated on the cathode current collector 30 by vacuum pumping, hot pressing or spraying. For example, the cathode current collector 30 is placed between two sheets of conductive film 12; then the conductive film 12 is coated and attached to the cathode current collector 30 by heating. The parts of the conductive film 12 that is beyond the cathode current collector 30 are well sealed. The thickness of one sheet of the conductive film 12 is 10-200 μm.

The conductive film has been described in detail previously and not repeated here.

The anode 44 is selected from metal, alloy or carbon-based material.

Specifically the anode 44 comprise at least one metal selected from Zn, Ni, Cu, Ag, Pb, Mn, Sn, Fe, Al or a passivated metal thereof or an alloy containing metal thereof or graphite foil, graphite sheet, carbon cloth, carbon felt, carbon fibers or tinned copper or brass.

Electrolyte 28 has already been described previously and no more repeated.

The main difference of battery 400 and battery 20 is that battery 400 has an internal parallel structure. Therefore, the basic component of battery may not be described here.

In embodiment 5 the battery 400 further includes a separator 34 to retain the electrolyte 28 and prevent the battery 400 from short circuit. The separator 34 is sandwiched between the cathode 42 and the anode 44. Specifically the anode 44, the separator 34, the cathode 42, separator 34 and negative 44 are stacked and placed in a package housing. The electrolyte is retained in the separator 34 to ensure the ion conduction path between the cathode 42 and the anode 44.

Separator 34 may be selected from a porous membrane, non-woven fabric or glass fiber. Porous membrane includes, but is not limited to one of polyethylene (PE), polypropylene (PP), polyimide or PE-PP, PP-PE-PP laminate membrane. Non-woven fabric includes, but is not limited to rayon, cellulose acetate and nylon. The amount of electrolyte 28 retained in the separator 34 may be in the range of retention of the separator 34 or beyond the range, because the battery 20 is configured with a seal part 36 to avoid leakage of the electrolyte 28.

In order to prevent external shock and deterioration of the environment the laminated and sealed battery 400 is all sealed by an encapsulating material or housing. Encapsulating material or housing material is preferably a metal material coated with a polymer, such as a metal coated with a polypropylene film. The metal includes, but is not limited to aluminum, stainless steel, nickel or copper.

Figure 10:
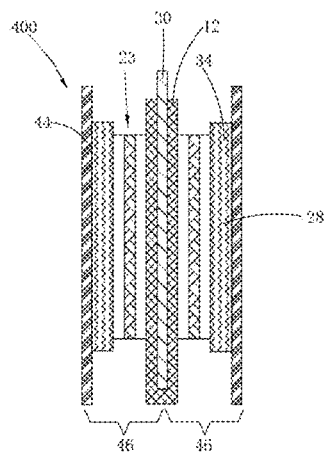
FIG. 10 schematically shows battery unit in the fifth embodiment.

As shown in FIG. 10, the cathode 42 is disposed between the anodes 44. Two anodes 44 share the cathode 42. Electrons are exported or imported from the cathode current collector 30 and the anode 44. The battery 400 has two battery units 46 in parallel. Each battery unit 46 has a cathode 42, an anode 44, an electrolyte 28 and separator 34 which retains the electrolyte 28. Since the battery unit 46 is connected in parallel, the electrolyte 28 may be in any battery unit 46 without causing short circuit. The battery 400 can work normally and stably.

Comparing to battery comprising separate battery unit connected in parallel, the battery 400 provided in present invention uses only one cathode 42 to make battery units 46 connect in parallel. Two anodes 44 share one cathode 42. Both surfaces of the cathode current collector 30 are used to be coupled with the cathode plate 23, which not only save the cathode material, but also make the battery more compact and lighter. Therefore the battery 400 has an excellent energy density and power density. Finally, the battery 400 using the aqueous electrolyte 28 is safer and more environmentally friendly comparing to the current commercial lithium-ion batteries using organic electrolyte.

The preparation process of the battery 400 is simple which can be prepared by laminating. Specifically, the anode 44, the separator 34 impregnated with the electrolyte 28, the cathode 42 and the anode 44 are arranged in a fixed sequence and packaged. Battery 400 has two battery units 46 connected in parallel. Seal part is no need here to seal the battery units 46. The battery 400 with an internal parallel structure can work normally and stably and has an excellent charge-discharge characteristic, higher output capacity and wide scope of applications.

Embodiment 6

Figure 11:
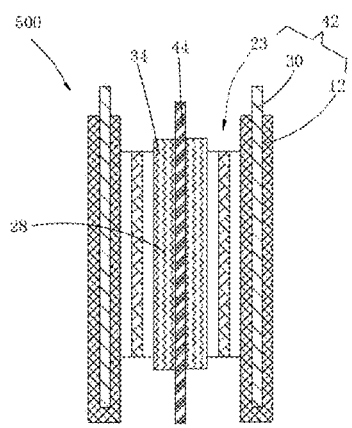
FIG. 11 schematically shows battery structure in cross section in a sixth embodiment.

As shown in FIG. 11, the embodiment 6 provides a battery 500 comprising two cathodes 42, an anode 44 and an electrolyte 28. The anode 44 is sandwiched between two cathodes 42 and two cathodes 42 share the anode 44. The electrolyte 28 is sandwiched between the cathode 42 and the anode 44.

The material and preparation method of the cathode, anode and the electrolyte are the same as that in embodiment 5, there will be no more description.

Both batteries in embodiment 5 and 6 have two battery units connected in parallel. The difference is that in embodiment 5 the battery 400 has two anodes 44 sharing a cathode 42 and in embodiment 6 the battery 500 has two cathodes 42 sharing an anode 44. Therefore the structure of the battery in the present invention can be multiple according to the production process, the weight of cathode and anode, material costs and other factors. The obtained battery finally has advantages of low cost and excellent performance.

Batteries in embodiment 5 and 6 have an internal parallel structure. Compared to battery with parallel structure in prior art, the battery is more material saving, compact, lightweight and has obvious advantages in energy density and volume; secondly, the battery using the aqueous electrolyte which has high ion conductivity is safer and more environmentally friendly; finally, a battery with different output capacity could be prepared according to usage requirement. The battery has wide scope of application.

Embodiment 7

The embodiment 7 provides a battery 600 comprising a cathode 42, an anode 44 and an electrolyte 28.

The cathode 42 comprises a combined current collector and a cathode plate 23. The combined current collector comprises a cathode current collector 30 and a conductive film 12 which is coated on the cathode current collector 30. The cathode plate 23 comprises a cathode active material 50 which is capable of reversibly intercalating-deintercalating a first metal ions. The combined current collector has two opposite surface and the cathode plate 23 is coupled to at least one surface which faces to the anode. The cathode 42 have been described previously and no more repeated here.

Battery comprises n pair of cathodes and anode, wherein n≥2. The cathodes and anode are arranged alternately. Two adjacent cathodes 42 share an anode 44 located between these two adjacent cathodes 42 and two adjacent anodes 44 share a cathode 42 located between these two adjacent anodes 44. Specific to FIG. 12, the battery 600 includes two pairs of cathode 42 and anode 44.

The cathode plate 23 further comprises an electrochemically inert carrier in embodiment 7. The cathode active material 50 is formed on the carrier.

Anode and electrolyte have also been introduced in the previous and not repeated here.

Figure 12:
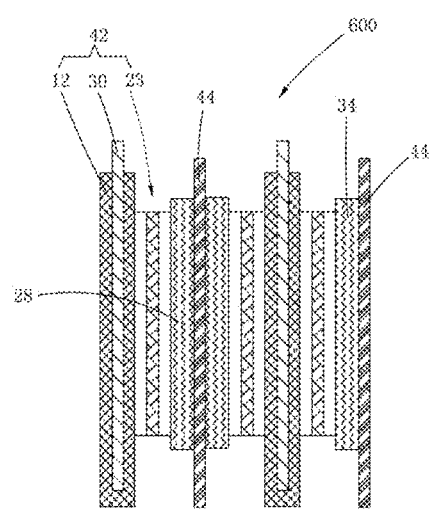
FIG. 12 schematically shows battery structure in cross section in a seventh embodiment, wherein the number of the cathode and anode is two.

As shown in FIG. 12, the combined current collector has two opposite surfaces. When the cathode 42 is located between two anodes 44, both surfaces of the combined current collector are facing to the anode, thus the cathode plate 23 is coupled to both surfaces of the combined current collector; as for the cathode 42 located outermost, at least one surface of the combined current collector that is facing to the anode are formed with the cathode plate 23. The other surface is not particularly limited.

Figure 13:
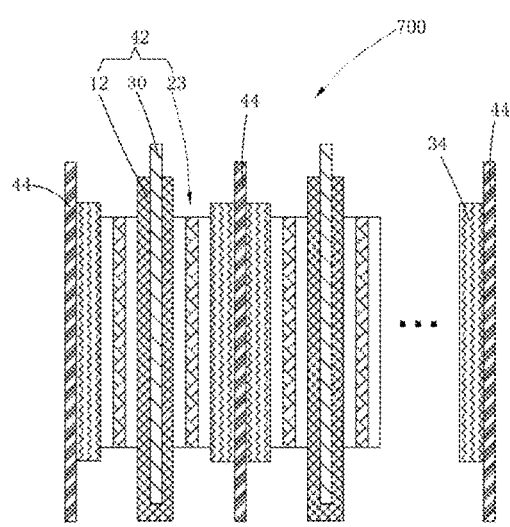
FIG. 13 schematically shows battery structure in cross section in the seventh embodiment, wherein the number of the cathode and anode is greater than two.

As shown in FIG. 12, the battery 600 comprising two pairs of cathode 42 and anode 44 has three battery units (not shown) connected in parallel. In the actual production, the battery structure can be easily altered by altering the number of cathode and anode according to usage requirements. As shown in FIG. 13, although the total battery output voltage has not changed, but the battery has a higher capacity. The battery structure is flexible, versatile and has the probability of industrialization.

In a battery system containing neutral electrolyte, it is difficult to find a cathode current collector which could meets the requirements of mechanical properties, excellent electrical properties and stable in the neutral electrolyte. So the commercialization of aqueous battery has been stalled. The battery provided in the present invention provides a solution to this problem. The cathode comprises a cathode current collector, a conductive film and a cathode plate. The conductive film is formed on the cathode current collector, which improves the conductivity of the cathode current collector, and more important protect the cathode current collector from being corroded by neutral electrolyte. The cathode current collector can collect and export electronic stably during discharge process, so as to ensure that the battery has a stable cycle performance. The battery has good commercial prospect.

The present invention also provides a battery pack. The battery pack comprises a number of batteries as described above. Specifically speaking, more than two batteries are connected in series or in parallel or combination thereof to produce the battery pack. Capacity and voltage of the battery pack can be freely adjusted by changing the connecting mode of batteries. The battery or battery pack prepared by the batteries can be used as vehicle or train's power and uninterruptible power supply.

Electrode Plate

The present invention also provides an electrode plate which is easy processing and sorting and has a uniform thickness and performance consistency. The battery using this electrode plate has a low price, good cycle performance and high energy.

Figure 14:
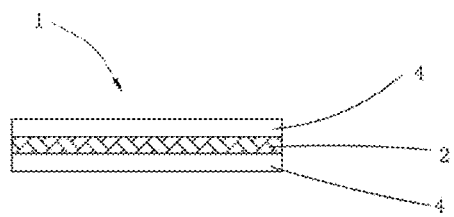
FIG. 14 schematically shows electrode plate structure, wherein an active material layer is formed on a first and second surface of the carrier.

As shown in FIG. 14, an electrode plate 1 comprises an electrochemically inert carrier 2 and an active material layer 4 formed on the carrier 2. The electrode plate 1 can be applied to cathode or anode of battery. In order to make the battery have a higher energy density, the preferred thickness range of the electrode plate 1 is 0.3-1.5 mm. In one embodiment the thickness of the electrode plate 1 is 0.4 mm.

The active material layer 4 is formed on the carrier 2. The carrier 2 has two opposite surfaces defined as a first surface and a second surface. Without limited, the active material layer 4 is formed on both surfaces of the carrier 2 or the active material layer 4 is formed on the first surface or the second surface.

In the present invention, it should be understood that the electrode plate 1 comprises the essential active material layer, but not a current collector. In prior art the usual method to prepare electrode is to coat slurry with active material on a current collector. In this process the whole electrode can only be weighed when sorting cathode. Concerning uneven distribution of weight of cathode current collector, the weight of cathode active material cannot be accurately measured, thus cathode capacity will be different and the battery consistency and qualification rate will be affected. The electrode plate 1 provided in the present invention is prepared separately from the current collector. In the process of preparing the electrode plate 1, the active material layer 4 could be individually weighed and sorted, which greatly improve the consistency of the battery and make the battery assemble easily.

The active material layer 4 comprises an electrode active material, a binder and a conductive agent. The electrode active material involves in the electrochemical reaction. The electrode plate 1 can be applied to different types of batteries, such as nickel-hydrogen batteries, lead-acid batteries and lithium-ion batteries, based on the different types of electrode active materials.

In one embodiment, the electrode plate 1 is uses as a cathode; the electrode active material is a cathode active material. The cathode active material participates in electrochemical reaction. The weight percentage of the cathode active material in the cathode plate is 60-99%. In order to make the cathode have a high capacity, the surface density range of the cathode active material in the cathode plate is 200-2000 $g/m^2$. The cathode active material is capable of reversibly intercalating and deintercalating a first metal ion. Preferably the cathode active material is capable of reversibly intercalating and deintercalating lithium ions, sodium ions or magnesium ions. The cathode active material has been described previously and no more repeated here.

The role of the carrier 2 which is electrochemically inert is to bear the active material layer 4. As known to person in art, the electrochemically inert carrier does not participate in any electrochemical reaction which is only in the presence of the cathode plate to bear the cathode active material. In one embodiment, the carrier 2 has a porous structure and is electrical insulation. The pore size range of the carrier 2 is 50 meshes to 200 meshes, which ensure that the carrier 2 has a certain mechanical properties, and the active material layer 4 could adhere to the carrier 2 and peeling resistance force of the active material layer 4 and the carrier 2 is improved. Thus the electrode plate 1 could stably works in the battery and it is easy for ions transporting in the electrode active material.

Thickness of the carrier 2 is not particularly limited, and in order to ensure that the electrode plate 1 has high energy density, the thickness of the cathode plate should be controlled. Particularly the thickness range of the carrier 2 is less than 1 mm.

The carrier 2 may be a non-woven fabric. The non-woven fabric is processed by physical adhesive method without textile processing. The composition of the non-woven fabric is not particularly limited except for electrochemically inert. Non-woven fabric is low weight, stable performance, easy finalizing design and low cost. In the present invention, the application of non-woven fabric in combination with the active material layer in the electrode plate could enable that the electrode plate 1 has a lower weight and more stable electrochemical performance.

The material of the carrier 2 may be selected from at least one of polyethylene terephthalate (PET), polybutylene terephthalate (PBT), polyethylene (PE), polypropylene (PP), polyamide (PA), polyurethane (PU) and polyacrylonitrile (PAN). These materials can be stably present in the electrode plate 1 without participating in the electrochemical reaction, thus the battery has a high energy density output and low weight.

In prior art the usual method to prepare electrode is to coat slurry with active material on a current collector. For example, in lithium ion battery the slurry containing graphite is coated on a copper foil to form an anode; in lead-acid batteries the lead paste is coated on grid to form an anode. In this process the whole electrode can only be weighed when sorting cathode. Concerning uneven distribution of weight of cathode current collector, the weight of cathode active material cannot be accurately measured, thus cathode capacity will be different and the battery consistency and qualification rate will be affected. In the present invention, the ratio of the electrode active material, a binder and a conductive agent in the electrode plate 1 is accurate and consistent, and the electrochemically inert carrier 2 is a material with high consistency, thus the weight consistency of the electrode plate 1 is very high.

Preparation Method of Electrode Plate

The present invention also provides a preparation method of electrode plate 1 comprising the following steps:

A slurry is prepared and formed on an electrochemically inert carrier 2 to form an active material layer 4, finally dried molding; the carrier 2 has a porous structure and is electrical insulation.

Specifically the slurry comprises an electrode active material which involves in the electrochemical reaction, a binder and a conductive agent. The weight percentage range of electrode active material in the active material layer is 60-99% and the surface density range of the electrode active material in the active material layer is 100-3000 $g/m^2$. In order to make the battery have a high energy output, preferably the surface density range of the electrode active material is 200-2000 $g/m^2$.

The slurry is prepared by dispersing an electrode active material, a binder and a conductive agent in a dispersant and uniformly mixing. The dispersant includes but is not limited to water.

After the slurry is mixed, the slurry is formed on the carrier 2. The method of forming the slurry on the carries is not particularly limited, including blade coating, screen printing or slurry pulling.

In one embodiment, the slurry is coated on the carried by a slurry machine. In general, the slurry machine has a slurry storage tank; the carrier is guided into the storage tank by rollers and dipped into the slurry of which the viscosity is 3000-100000 mPa·s. The carrier 2 is pulled from the storage tank and the slurry is adhered thereon. The thickness of the slurry can be controlled by blade which can scrape off the excess slurry and make the slurry more uniform.

The carrier 2 coated with the slurry is dried. Usually the solvent in the slurry is removed by evaporation under atmospheric or low pressure and ambient or elevated temperature. The removal speed of solvent is maintained basically unchanged along the surface of the slurry. Preferably the condition of drying is under atmospheric pressure and 50-130° C., so obtained electrode plate a has a more uniform thickness. Finally, the electrode plate 1 is cut to a desired size.

In one embodiment, a slurry is prepared by mixing the cathode active material $LiMn_2O_4$, conductive agent Super-P, CMC and SBR as binder in water, and then the slurry is coated on a nylon net, dried at 70° C. to obtain a cathode plate which is rolled to a predetermined thickness.

The method of preparing the electrode plate 1 comprises the steps of taking a carrier characterized in uniform weight and an electrochemical inert as a substrate, coating a slurry containing the electrode active material, binder and conductive agent on the carrier and obtaining the electrode plate 1 without current collector. The method is simple. In the process of preparing the electrode plate, the active material layer can be weighed and sorted individually. The prepared electrode plate 1 has a uniform thickness, stable performance. Thus electrode containing the electrode plate 1 has a good consistency and is easy to assemble.

Electrode

Figure 15:
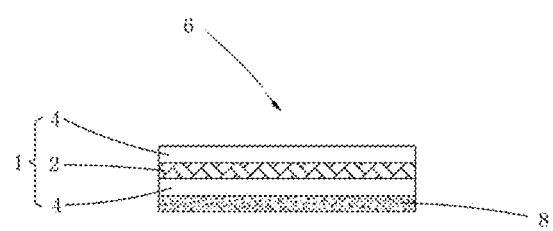
FIG. 15 schematically shows electrode structure in cross section.

As shown in FIG. 15, the present invention provides an electrode 6 comprising an electrode current collector 8 and an electrode plate 1. The electrode plate 1 comprises an electrochemically inert carrier 2 and an active material layer 4 formed on the carrier 2. The carrier 2 is electrical insulating and has porous structure.

Figure 16:
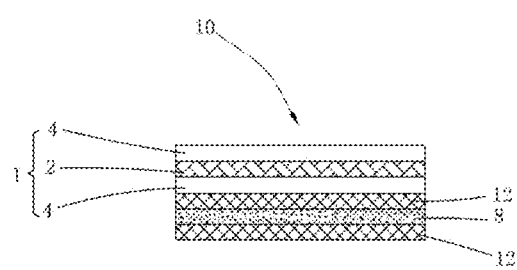
FIG. 16 schematically shows electrode structure in cross section, wherein the electrode current collector has a conductive film.

As shown in FIG. 16, a conductive film 12 is formed on the surface of the electrode current collector 8 in a certain manner. And then the electrode plate 1 is coupled to the conductive film 12 form an electrode 10. Specific to FIG. 16, the conductive film 12 is formed on both surfaces of the electrode current collector 8. On the one hand, the conductive film could protect the cathode current collector from being corroded by the electrolyte. On the other hand, it helps to reduce the contact resistance between the cathode current collector and the cathode plate and improve the battery energy.

Method of Preparing the Electrode

The present invention also provides a method of preparing the electrode 10 which comprises the following steps.

An electrode plate 1, a conductive film 12 and the electrode current collector 8 are bonded; the conductive film 12 is located between the electrode plate 1 and the electrode collector electrode 8. The electrode comprises an electrochemically inert carrier 2 and an active material layer 4 formed on the carrier 2. The carrier 2 is electrical insulating and has porous structure; the conductive film 12 comprises a polymer.

In the obtained electrodes 10, the conductive film 12 is located between the electrode plate 1 and the electrode current collector 8. The electrode collector 8 has two opposite surfaces. Without particularly limited, the conductive film 12 is formed on either surfaces or both surfaces of the electrode current collector 8 by hot pressing. Preferably both surfaces of the electrode current collector 8 are coated with the conductive film 12 and the electrode plate 1 one by one by hot pressing.

The electrode 10 may be cathode, anode or bipolar electrode. The electrode 10 could be applied to different types of batteries, such as nickel-hydrogen batteries, lead-acid batteries and lithium-ion batteries by applying different types of the active material layer of the electrodes 10.

In the electrode plate 1, the active material layer 4 is formed on the carrier 2 which has two opposite surfaces. Without particularly limited, the active material layer 4 is formed on either surfaces or both surfaces of the carrier 2. In addition, the carrier 2 is electrical insulation and has a porous structure, which ensures that the carrier has a certain mechanical properties, the active material layer 4 could adhere to the carrier 2 and peeling resistance force of the active material layer 4 and the carrier 2 is improved. Thus the electrode plate 1 could stably works in the battery and it is easy for ions transporting in the electrode active material.

The active material layer 4 and the carrier 2 have already been described in detail in the previous and no more repeated here. The conductive film 12 and the electrode current collector 8 will be further introduced respectively.

A conductive film 12 is configured between the electrode plate 1 and the electrode current collector 8. The conductive film should comply with the following requirements: stable and insoluble in the electrolyte, no swelling, no oxidization in high voltage, easy to process into a dense, impermeable and electrically conductive film. On one hand, the conductive film 12 could protect the electrode current collector from being corroded by the electrolyte. On the other hand, it helps to reduce the contact resistance between the electrode current collector 8 and the electrode plate 1 and improve the battery energy.

In order to enable most effective use of the conductive film 12, the thickness of the conductive film 12 need to be controlled. The conductive film 12 with thin thickness is easily damaged and penetrated by the electrolyte and with bad uniformity; the conductive film 12 with thick thickness may affect its conductivity. Preferably the thickness of the conductive film is 10 μm-2 mm, thus the conductive film 12 is able to effectively protect the electrode current collector 8, reduce the contact resistance between the electrode plate 1 the electrode current collector 8 and improve the battery energy.

In prior art the usual way to prepare an electrode comprises the following steps: coating a slurry containing an electrode active material on a current collector in a certain way. The preparing method of the electrode 10 in the present invention comprises combining the electrode plate 1, the conductive film 12 and the electrode current collector 8 together by hot pressing, thus the preparation of the electrode can be simplified and production efficiency can be improved. The conductive film 12 formed between the electrode plate 1 and the electrode current collector 8 could reduce the contact internal resistance between the electrode plate 1 and the electrode current collector 8. The electrode 10 has a good consistency.

The electrode current collector 8 has two opposite surfaces. Preferably both surfaces of the electrode current collector 8 are coated with the conductive film 12 and the electrode plate 1 in turn.

The material of the conductive film 12 has been introduced in the previous, no more repeated here.

The electrode current collector 8 serves as a carrier of electronic conduction and collection. The electrode current collector 8 should meet the requirements of large surface area, good mechanical properties and good conductivity. The electrode current collector 8 is selected from one of carbon based material, metal or alloy.

The carbon based material is selected from one of glassy carbon, graphite foil, graphite plate, carbon foam, carbon felt, carbon cloth and carbon fibre. In one embodiment, the electrode current collector is graphite, such as commercial graphite pressed foil, wherein graphite weight rate is in the range 90-100%.

The metal is a metal net or foil which is selected from one of Al, Fe, Cu, Pb, Ti, Cr, Mo, Co, Ag and passivated metal thereof.

The main purpose of passivating the metal is to form a passivated oxide film thereon, so that the electrode current collector does not participate in electrochemical reaction during the process of battery charging and discharging, which ensures the stability of battery in the present invention.

The alloy is selected from one of stainless steel, Al alloy, Ni alloy, Ti alloy, Cu alloy, Co alloy, Ti—Pt alloy, Pt—Rh alloy, or passivated alloy thereof.

Stainless steel includes stainless steel foil or stainless steel net. Specifically, the mode of stainless steel can be but not limited to 300 series stainless steel, such as stainless steel 304, 316 or 316 L.

Similarly the main purpose of passivating stainless steel is to make it stably collect and conduct electron and not participating in electrochemical reaction. In one embodiment, the process of passivating stainless steel includes the following steps: preparing 20% $HNO_3$ solution, controlling the temperature at 50° C., putting stainless steel mesh or foil in and maintaining for half an hour, then taking out the stainless steel, washing with water and drying. The stainless steel being passivated could be used as an electrode current collector.

Thickness of the electrode current collector 8 has a certain effect on electrochemical properties of the electrode 10. Thin thickness will affect the mechanical strength of the electrode current collector 8; thick thickness will increase the weight of the electrode 10 and affect the energy density of the electrode 10. In the present invention the thickness of the electrode current collector 8 is preferably 10 μm-100 μm to make the battery have a high energy density output.

For example, the electrode current collector 8 is stainless steel which could be treated by punching with the preferred pore size range 500 μm-5 mm; or by polishing with sandpaper to make the surface of stainless steel rough; or micro corroding with appropriate weak acid to increase the surface area of stainless steel without damaging its mechanical properties. The electrode collector 8 being treated has a large specific surface area, which helps to improve the compound degree of electrode current collector 8 and the conductive film 12, lower the contact resistance between the electrode plate 1 and the electrode current collector 8.

Specifically speaking, the electrode plate 1, the conductive film 12 and the electrode current collector 8 are bonded by hot pressing, which is heating the polymer of the conductive film under temperature above the glass transition temperature of the polymer to make the polymer soften and adhere to the current collector, mean while a certain pressure may be applied. The pressure is not particularly limited, the main purpose of applying pressure is to make the electrode plate 1, and the conductive film 12 and electrode current collector 8 are tightly. Specifically, the temperature of hot pressing should meet the following criteria: $T_g<T<T_m$, wherein $T_g$ is the glass transition temperature of the polymer of the conductive film, T, is the melting point of the polymer of the conductive film.

The electrode could be prepared by one step hot pressing. Specifically, the conductive film 12 is placed between the electrode plate 1 and the electrode current collector 8, and then the electrode plate 1, the conductive film 12 and the electrode current collector are combined together by hot pressing.

The electrode could be prepared by two steps hot pressing. The first step of hot pressing is to combining the conductive film 12 with the electrode current collector 8 or combining the conductive film 12 with the electrode plate 1. Correspondingly, the second step of hot pressing is to combining the conductive film 12 with the electrode plate 1, or combining the conductive film 12 with the electrode current collector 8.

Preferably the first step is to combining conductive film 12 with the electrode current collector 8. And more preferably two sheets of the conductive film 12 are bonded to the two opposite surfaces of the electrode current collector 8.

The electrode current collector 8 is placed between two sheets of conductive film 12. The area of the conductive film 12 at least equal to the area of the electrode current collector 8, so that, in the first step hot pressing, the polymer as the main component of the conductive film 12 has a certain ductility, the rolled conductive film 12 completely covers the first surface and the second surface of the electrode current collector 8, and then the conductive film 12, electrode current collector 8 and the conductive film 12 are hot pressed together.

The priority is to combine the conductive film 12 to the electrode current collector 8. After being rolled the exceeding parts of the conductive film 12 beyond the electrode current collector 8 could be completely sealed, which could protect the electrode current collector 8 from being corroded by the electrolyte. More importantly, the conductive film 12 can reduce the contact resistance between the electrode plate 1 and the electrode current collector 8.

In the second step of hot pressing, two sizable sheets of the electrode plates are hot pressed onto the conductive film 12 to obtain the electrode.

The active material layer of the electrode plate further comprises a polymer binder, of which the weight percent in active material layer is 0.5 to 10%. Because the amount of polymer binder is less, there will be no obvious change in polymer binder during hot pressing process and the shape and performance of the electrode plate is not affected. Preferably, the temperature of hot pressing is below the decomposition temperature of the polymer binder.

The conductive film is configured between the electrode plate and the electrode current collector, which can not only improve the peeling resistance of the electrode plate and the electrode current collector and the stability of the electrode, and also reduce resistance between the electrode plate and the electrode current collector. A battery containing such an electrode has a high energy output.

Electrode provided in the present invention can optionally be configured to form a cathode comprising a cathode plate, a conductive film and a cathode current collector by hot pressing, to form an anode comprising an anode plate, a conductive film and an anode current collector or to form a bipolar electrode comprising a cathode plate, a conductive film, current collector and an anode plate.

The present invention will be further illustrated and explained through the following examples.

EXAMPLE a1

Zinc methanesulfonate and lithium methanesulfonate are weighed and dissolved in deionized water. And then an electrolyte containing 2 mol/L zinc methanesulfonate and 2 mol/L lithium methanesulfonate is obtained and referred to as A1.

EXAMPLE a2

Zinc methanesulfonate and lithium methanesulfonate are weighed and dissolved in deionized water. And then an electrolyte containing 2 mol/L zinc methanesulfonate and 5 mol/L lithium methanesulfonate is obtained and referred to as A2.

EXAMPLE a3

Zinc methanesulfonate and lithium methanesulfonate are weighed and dissolved in deionized water; meanwhile a bismuth trioxide is added therein. And then an electrolyte containing 3 mol/L zinc methanesulfonate, 3 mol/L lithium methanesulfonate and 1 wt % bismuth trioxide is obtained and referred to as A3.

EXAMPLE a4

Zinc methanesulfonate, lithium methanesulfonate, zinc sulfate and lithium sulfate are weighed and dissolved in deionized water. And then an electrolyte containing 1 mol/L zinc methanesulfonate, 1 mol/L lithium methanesulfonate, 1 mol/L zinc sulfate and 0.5 mol/L lithium sulfate is obtained and referred to as A4.

EXAMPLE a5

Zinc sulfate and lithium sulfate are weighed and dissolved in deionized water. And then a solution containing 2 mol/L zinc sulfate and 1 mol/L lithium sulfate is obtained and referred to as S1.

Zinc methanesulfonate and lithium methanesulfonate, are weighed and dissolved in deionized water. And then a solution containing 2 mol/L zinc methanesulfonate and 3 mol/L lithium methanesulfonate is obtained and referred to as S2.

Solution S1 and S2 are mixed in a volume ratio of 10:90 to obtain an electrolyte which is referred to as A5.

EXAMPLE a6

In example a6, solution S1 and S2 are mixed in a volume ratio of 25:75 to obtain an electrolyte which is referred to as A6. Solution S1 and S2 are the same as Example a5.

EXAMPLE a7

In example a7, solution S1 and S2 are mixed in a volume ratio of 50:50 to obtain an electrolyte which is referred to as A7. Solution S1 and S2 are the same as Example a5.

EXAMPLE a8

In example a8, solution S1 and S2 are mixed in a volume ratio of 90:10 to obtain an electrolyte which is referred to as A8. Solution 51 and S2 are the same as Example a5.

COMPARATIVE EXAMPLE ac1

Zinc sulfate and lithium sulfate are weighed and dissolved in deionized water. And then an electrolyte containing 2 mol/L zinc sulfate and 1 mol/L lithium sulfate is obtained and referred to as AC1.

Battery Preparation

A cathode homogeneous slurry is prepared by dissolving 90 wt % $LiMn_2O_4$ as the cathode active material, 5% conductive agent graphite, 2.5% SBR and 2.5% CMC as binder in water. The cathode slurry is coated evenly on both sides of a combined current collector to form a active material layer, and then pressed and cut to a size 8 cm×10 cm (for gas production test) or 6 cm×6 cm (for other battery performance test) cathode. The thickness of the cathode is 0.4 mm and the surface density of the cathode active material is 750 g/m². The combined current collector comprises 50 μm thick stainless steel mesh which serves as a cathode current collector and a conductive film coated thereon.

The anode is a 50 μm thick zinc foil. An AGM glass fiber is used as separator. The size of the anode and separator is the same as the cathode.

The cathode, anode, separator with electrolyte A1-A8 and AC1 respectively are assembled into batteries which are referred to as B1-B8 and BC1.

Performance Testing
Deep Freezing Test

The electrolyte A1-A4 and AC1 are placed at −20□ for 12 h, and then taken out to observe whether the electrolytes are frozen. The test results are shown in Table 1.

TABLE 1

| electrolyte freezing test results | | | | | |
|---|---|---|---|---|---|
| Electrolyte | A1 | A2 | A3 | A4 | AC1 |
| Whether frozen | No frozen | No frozen | No frozen | No frozen | frozen |

As can be seen from Table 1, the electrolytes provided by Example a1-a4 are not frozen, while the electrolyte in comparative example ac1 after 12 h is frozen, which indicates that the electrolyte containing alkyl sulfonate ion may inhibit low temperature freezing, improve the low temperature performance of the electrolyte, and enhance low temperature durability of the battery.

Gas Production Testing

Battery B1 and BC1 are placed at 60° C. for one day. The gas produced by the batteries is collected respectively. The result is shown in FIG. 17, in which dots represent the result of battery BC1 and squares represent the result of battery B1.

Figure 17:
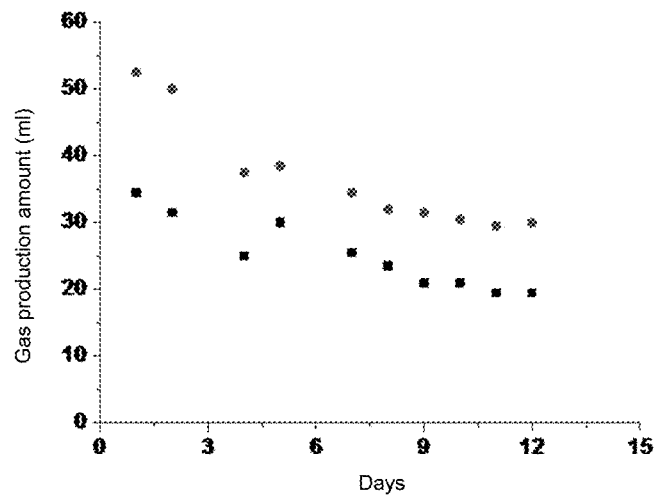
FIG. 17 comparatively shows gas production amount in example a1 and ac1.

As can be seen from FIG. 17, the amount of gas generated by the battery BC1 is far more than (almost twice) the amount of gas generated by the battery B1 per day, which indicates that comparing to the electrolyte containing sulfate, the electrolyte containing alkyl sulfonate ion can effectively suppress gas production.

5 g zinc powder is weighed and added to 20 ml electrolyte A1 and A3, placed at 50□ for several days, then gas production is measure respectively. The results are shown in Table 2.

TABLE 2

| gas production of electrolyte A1 and A3 | | | | | |
|---|---|---|---|---|---|
| Electrolyte | Day $1^{st}$ | Day $2^{nd}$ | Day $3^{rd}$ | Day $4^{th}$ | Day $5^{th}$ |
| A1 | 29 ml | 42 ml | 38 ml | 23 ml | 35 ml |
| A3 | 22 ml | 27 ml | 15 ml | 11 ml | 10 ml |

As can be seen from Table 2, the gas production amount of electrolyte A3 is far less than the gas production amount of electrolyte A1, which indicates that the combined effect of bismuth compound and alkyl sulfonate ion in the electrolyte could further reduce the gas production amount of the battery.

Self-Discharge Performance Testing

Cathodes described above are prepared and placed in the electrolyte A1 and AC1 at 60□ for one day. Self-discharge rate of cathode are tested. The results are shown in Table 3.

TABLE 3

| cathode capacity retention in electrolyte A1 and AC1 | |
|---|---|
| Electrolyte | Capacity Retention/% |
| A1 | 96.5 |
| AC1 | 90.4 |

As can be seen from Table 3, the capacity retention of cathode in the electrolyte A1 is much larger than the capacity retention of cathode in the electrolyte in AC1.

The battery B5-B8 and BC1 are stored at 60□ for 24 hours and then withstood a cycle of discharge and charge. The aforementioned steps are repeated nine times. The remaining capacity of the batteries are tested and shown in Table 4.

TABLE 4 self-discharge of battery B5-B8 at 60° C.

| Battery | Capacity Retention |
| --- | --- |
| B5 | 94.3% |
| B6 | 96.1% |
| B7 | 94.0% |
| B8 | 90.0% |
| BC1 | 87.0% |

As can be seen from Table 4, the capacity retention of battery B5-B8 has improved dramatically comparing to battery BC1, which shows that the addition of alkyl sulfonate in electrolyte can effectively suppress the self-discharge of battery.

Rate Discharge Performance Testing

Battery B1 and BC1 are charged and discharged with a 0.2 C rate, 1 C rate and 3 C rate for three times each, then cycled with a 1 C rate.

Taking discharge capacity with a 0.2 C rate as a baseline, the discharge capacity of battery B1 with a 3 C rate is 52.8%, with a 1 C rate is 95%. The discharge capacity of battery BC1 with 3 C rate and 1 C rate are 35% and 60% respectively. This shows that the electrolyte can effectively improve the high-rate cycling performance of battery.

EXAMPLE c1

A cathode homogeneous slurry is prepared by dissolving 90 wt % $LiMn_2O_4$ as the cathode active material, 5% graphite as conductive agent, 2.5% SBR and 2.5% CMC as binder in water. The cathode slurry is coated evenly on both sides of a combined current collector to form an active material layer, and then pressed and cut to a size 8 cm×10 cm cathode. The thickness of the cathode is 0.4 mm and the surface density of the cathode active material is 750 g/m². The combined current collector comprises 50 μm thick stainless steel mesh which serves as a cathode current collector and a conductive film coated thereon.

The anode is a 50 μm thick zinc foil. An AGM glass fiber is used as separator. The size of the anode and separator is the same as the cathode.

Zinc sulfate and lithium sulfate are weighed and dissolved in water; meanwhile a bismuth trioxide is added therein. And then an electrolyte containing 2 mol/L zinc sulfate, 1 mol/L lithium sulfate and 1 wt % bismuth trioxide is obtained.

The electrolyte is added dropwise to one side of the separator, and then the cathode, the separator and the anode are stacked and loaded into a case, then a battery is formed and referred to as C1. The side with the electrolyte faces to the anode.

EXAMPLE c2

In Example c2, the content of the bismuth trioxide is 2 wt %. The other part of the battery is the same as example c1. The battery is referred to as C2.

EXAMPLE c3

In Example c3, the content of the bismuth trioxide is 0.1 wt %. The other part of the battery is the same as example c1. The battery is referred to as C3.

EXAMPLE c4

In Example c4, the content of the bismuth trioxide is 10 wt %. The other part of the battery is the same as example c1. The battery is referred to as C4.

EXAMPLE c5

In Example c5, the bismuth trioxide is replaced by bismuth nitrate. The other part of the battery is the same as example c1. The battery is referred to as C5.

EXAMPLE c6

A cathode homogeneous slurry is prepared by dissolving 90 wt % $LiMn_2O_4$ as the cathode active material, 5 wt % graphite as conductive agent, 2.5 wt % SBR and 2.5 wt % CMC as binder in water. The cathode slurry is coated evenly on both sides of a combined current collector to form an active material layer, and then pressed and cut to a size 6 cm×6 cm cathode. The thickness of the cathode is 0.4 mm and the surface density of the cathode active material is 750 g/m². The combined current collector comprises 50 μm thick stainless steel mesh which serves as a cathode current collector and a conductive film coated thereon.

An anode slurry is prepared by dissolving 90 wt % zinc powder as the anode active material, 1 wt % bismuth trioxide and 9 wt % PTFE as binder in water. The slurry is coated on a stainless steel plate, and then pressed into the anode.

An AGM glass fiber is used as separator. The size of the anode and separator is the same as the cathode.

Zinc sulfate and lithium sulfate are weighed and dissolved in water. And then an electrolyte containing 2 mol/L zinc sulfate and 1 mol/L lithium sulfate is obtained.

The cathode, the separator and the anode are stacked and loaded into a case. The case is added with the electrolyte, and then sealed. A battery is formed and referred to as C6.

EXAMPLE c7

In Example c7, the bismuth trioxide is replaced by bismuth nitrate. The other part of the battery is the same as example c6. The battery is referred to as C7.

EXAMPLE c8

A cathode homogeneous slurry is prepared by dissolving 90 wt % $LiMn_2O_4$ as the cathode active material, 5% graphite as conductive agent, 2.5% SBR and 2.5% CMC as binder in water. The cathode slurry is coated evenly on both sides of a combined current collector to form an active material layer, and then pressed and cut to a size 6 cm×6 cm cathode. The thickness of the cathode is 0.4 mm and the surface density of the cathode active material is 750 g/m². The combined current collector comprises 50 μm thick stainless steel mesh which serves as a cathode current collector and a conductive film coated thereon.

An anode slurry is prepared by dissolving 90 wt % zinc powder as the anode active material, 1 wt % bismuth trioxide and 9 wt % PTFE as binder in water. The slurry is coated on a stainless steel plate, and then pressed into the anode.

An AGM glass fiber is used as separator. The size of the anode and separator is the same as the cathode.

Zinc sulfate and lithium sulfate are weighed and dissolved in water; meanwhile a bismuth trioxide is added therein. And then an electrolyte containing 2 mol/L zinc sulfate, 1 mol/L lithium sulfate and 0.01 wt % bismuth trioxide is obtained.

The electrolyte is added dropwise to one side of the separator, and then the cathode, the separator and the anode are stacked and loaded into a case, then a battery is formed and referred to as C8. The side with the electrolyte faces to the anode.

COMPARATIVE EXAMPLE cc1

A cathode homogeneous slurry is prepared by dissolving 90 wt % $LiMn_2O_4$ as the cathode active material, 5% graphite as conductive agent, 2.5% SBR and 2.5% CMC as binder in water. The cathode slurry is coated evenly on a 50 μm thick stainless steel mesh which serves as a cathode current collector to form an active material layer, and then pressed and cut to a size 6 cm×6 cm cathode. The thickness of the cathode is 0.4 mm and the surface density of the cathode active material is 750 g/m².

The anode is a 50 μm thick zinc foil. An AGM glass fiber is used as separator. The size of the anode and separator is the same as the cathode.

Zinc sulfate and lithium sulfate are weighed and dissolved in water. And then an electrolyte containing 2 mol/L zinc sulfate and 1 mol/L lithium sulfate is obtained.

The cathode, the separator and the anode are stacked and loaded into a case. The case is added with the electrolyte and sealed. A battery is formed and referred to as CC1.

Gas Production Testing

Figure 18:
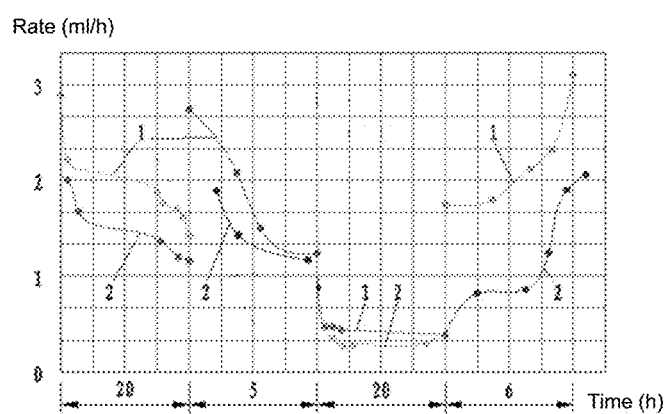
FIG. 18 comparatively shows gas production amount in example c1 and cc1.

Battery C1 and CC1 are charged and discharged at 60□ for several cycles, laid up for 20 h, then discharged for 5 h, laid up for 20 h, and finally charged for 6 h. Gas production amount of battery is recorded per hour. The results are shown in FIG. 18. In FIG. 18, 1 represents battery C1 and 2 represents battery CC1.

As can be seen from FIG. 18, no matter in standing or in charging and discharging, the amount of gas production of battery C1 is far less than that of battery CC1. This shows that the battery can effectively suppress the generation of gas.

Battery C1-C4 and CC1 are placed at 50° C. and room temperature (RT) for several days. The cumulative amount of gas production of battery is recorded. The results are shown in Table 5.

TABLE 5 gas production amount at 50□ and room temperature

| Battery | content of bismuth compound | 50□/ml Day 1$^{st}$ | Day 2$^{nd}$ | Day 3$^{rd}$ | RT/ml Day 1$^{st}$ |
| --- | --- | --- | --- | --- | --- |
| C3 | 0.1% | 49 | 110 | 152 | 5 |
| C1 | 1.0% | 41 | 109 | 143 | 7 |
| C2 | 2.0% | 45 | 118 | 162 | 9 |
| C4 | 10.0% | 47 | 126 | 195 | 20 |
| CC1 | 0.0% | 85 | 176 | 290 | 21 |

As can be seen from Table 5, the amount of gas production of battery C1-C4 is less than that of battery CC1 at room temperature. Especially the amount of gas production of battery C1-C3 is more than times less than that of battery CC1. The amount of gas production of battery C1-C4 is less than that of battery CC1 at 50□. This shows that the battery of the present invention can effectively suppress the generation of gas no matter in standing at room temperature or high temperature.

EXAMPLE d1

A cathode homogeneous slurry is prepared by dissolving 90 wt % $LiMn_2O_4$ as the cathode active material, 5% graphite as conductive agent, 2.5% SBR and 2.5% CMC as binder in water. The cathode slurry is coated evenly on both sides of a combined current collector to form an active material layer, and then pressed and cut to a size 6 cm×6 cm cathode. The combined current collector comprises 50 μm thick stainless steel plate which serves as a cathode current collector and a conductive film coated thereon.

The anode is a 50 μm thick zinc foil. An AGM glass fiber is used as separator. The size of the anode and separator is the same as the cathode.

Zinc sulfate and lithium sulfate are weighed and dissolved in water. Meanwhile gelatin is added therein. And then an electrolyte containing 2 mol/L zinc sulfate, 1 mol/L lithium sulfate and 0.05 wt % gelatin is obtained.

The cathode, the separator and the anode are stacked and loaded into a case. The case is added with the electrolyte and sealed. Then a battery is formed and referred to as D1.

EXAMPLE d2

In example d2, the content of gelatin is 0.01 wt %. The other part of battery is the same as example d1. The battery is referred to as D2.

EXAMPLE d3

In example d3, the content of gelatin is 0.5 wt %. The other part of battery is the same as example d1. The battery is referred to as D3.

EXAMPLE d4

In example d4, the electrolyte is a water solution containing 2 mol/L zinc methanesulfonate, 3 mol/L lithium methanesulfonate and 0.05 wt % gelatin. The battery is referred to as D4.

EXAMPLE d5

In example d5, the content of gelatin is 0.01 wt %. The other part of battery is the same as example d4. The battery is referred to as D5.

EXAMPLE d6

In example d6, the content of gelatin is 0.5 wt %. The other part of battery is the same as example d4. The battery is referred to as D6.

EXAMPLE d7

In example d7, the gelatin is replaced by dextrin. The other part of battery is the same as example d1. The battery is referred to as D7.

EXAMPLE d8

In example d8, the gelatin is replaced by agar. The other part of battery is the same as example d1. The battery is referred to as D8.

EXAMPLE d9

A cathode homogeneous slurry is prepared by dissolving 90 wt % $LiMn_2O_4$ as the cathode active material, 5% graphite as conductive agent, 2.5% SBR and 2.5% CMC as binder in water. The cathode slurry is coated evenly on both sides of a combined current collector to form an active material layer, and then pressed and cut to a size 6 cm×6 cm cathode. The combined current collector comprises 50 μm thick stainless steel plate which serves as a cathode current collector and a conductive film coated thereon.

Zinc methanesulfonate and lithium methanesulfonate are weighed and dissolved in water. Meanwhile gelatin is added therein. And then an electrolyte containing 2 mol/L zinc methanesulfonate and 3 mol/L lithium methanesulfonate is obtained.

The anode is a 50 μm thick zinc foil. A dispersion is prepared containing 2 wt % gelatin and 98 wt % zinc sulfate with a concentration of 1.5 mol/L. the dispersion is coated on the anode, then dried.

An AGM glass fiber is used as separator. The size of the anode and separator is the same as the cathode.

The cathode, the separator and the anode are stacked and loaded into a case. The case is added with the electrolyte and sealed. Then a battery is formed and referred to as D9.

EXAMPLE d10

In example d10, a dispersion is prepared containing 20 wt % gelatin and 80 wt % zinc sulfate with a concentration of 1.5 mol/L. The other part of battery is the same as example d9. The obtained battery is referred to as D10.

COMPARATIVE EXAMPLE dc1

A cathode homogeneous slurry is prepared by dissolving 90 wt % $LiMn_2O_4$ as the cathode active material, 5% graphite as conductive agent, 2.5% SBR and 2.5% CMC as binder in water. The cathode slurry is coated evenly on both sides of a combined current collector to form an active material layer, and then pressed and cut to a size 6 cm×6 cm cathode. The combined current collector comprises 50 μm thick stainless steel plate which serves as a cathode current collector and a conductive film coated thereon.

The anode is a 50 μm thick zinc foil. An AGM glass fiber is used as separator. The size of the anode and separator is the same as the cathode.

Zinc sulfate and lithium sulfate are weighed and dissolved in water. And then an electrolyte containing 2 mol/L zinc sulfate and 1 mol/L lithium sulfate is obtained.

The cathode, the separator and the anode are stacked and loaded into a case. The case is added with the electrolyte and sealed. A battery is formed and referred to as DC1.

COMPARATIVE EXAMPLE dc2

In comparative example dc2, the electrolyte is a water solution containing 2 mol/L zinc methanesulfonate and 3 mol/L lithium methanesulfonate. The other part of battery is the same as comparative example dc1. The obtained battery is referred to as DC2.

Dendrite Testing at Room Temperature

The batteries D1-D10 and DC1-DC2 are charged and discharged at room temperature for a set time, and then disassembled to observe dendrite. The results are shown in Table 6.

TABLE 6 observation results of dendrite

| Battery | Cycles | Zinc deposition on separator | Dendrite on separator | Dendrite on anode |
|---|---|---|---|---|
| D1 | 70 | No deposition | No | No |
| D2 | 70 | No deposition | No | No |
| D3 | 70 | No deposition | No | No |
| D4 | 70 | No deposition | No | No |
| D5 | 70 | No deposition | No | No |
| D6 | 70 | No deposition | No | No |
| D7 | 30 | No deposition | No | No |
| D8 | 30 | No deposition | No | No |
| D9 | 45 | A little zinc deposition | No | No |
| D10 | 75 | A little zinc deposition | No | No |
| DC1 | 30 | Lots of zinc deposition | Lots of dendrite | Lots of dendrite |
| DC2 | 30 | Lots of zinc deposition | Lots of dendrite | Lots of dendrite |

As can be seen from Table 6, there are no obvious dendrite of batteries D1-D6 after 70 cycles, batteries D7-D8 after 30 cycles, battery D9 after 45 cycles and battery D10 after 75 cycles. There are a lot of dendrite of batteries DC1 and DC2 after 30 cycles. This indicates that the addition of anode modifier can greatly suppress dendrite generation of anode, which could effectively improve the safety performance of the battery.

Dendrite Testing at High Temperature

The batteries D1-D6 are charged and discharged at 60° C. for 10 cycles, and then disassembled to observe dendrite. The results are shown in Table 7.

TABLE 7 observation results of dendrite

| Battery | Zinc deposition on separator | Dendrite on separator | Dendrite on anode |
|---|---|---|---|
| D1 | No deposition | No | No |
| D2 | No deposition | No | No |
| D3 | No deposition | No | No |
| D4 | No deposition | No | No |
| D5 | No deposition | No | No |
| D6 | No deposition | No | No |

As can be seen from Table 7, there is no dendrite of batteries D1-D6 at 60° C. This shows that the anode modifier is well dispersed in the electrolyte. Even at 60° C. it could still well suppress the generation of anode dendrite and improve the high temperature performance of the battery.

Gas Production Testing 5 g zinc powder is weighed, added to 20 ml electrolyte D2 and DC2 respectively, and then sealed, laid up at 50° C. for 3 days. The amounts of gas production per day are recorded. The test results are shown in Table 8.

TABLE 8 gas production amount of electrolyte D2 and DC2 at 50□

| Electrolyte | gas production amount/mL | | |
|---|---|---|---|
| | Day $1^{st}$ | Day $2^{nd}$ | Day $3^{rd}$ |
| D2 | 7.3 | 8 | 15.3 |
| DC2 | 54 | 50 | 64 |

As can be seen from Table 8, the amount of gas production of battery D2 is much lesser than that of battery DC2. This shows that the addition of anode modifier in the electrolyte can effectively suppress the side reaction between the anode active material and the electrolyte and reduce the gas production.

EXAMPLE f1

A cathode homogeneous slurry is prepared by dissolving 86.5 wt % $LiMn_2O_4$ as the cathode active material, 10% graphite as conductive agent, 2.5% SBR and 1% CMC as binder in water. The median size d50 of graphite is 3.4 µm, and the particle size d10 of graphite is 2 µm. The cathode slurry is coated evenly on both sides of a combined current collector to form an active material layer, and then pressed and cut to a size 6 cm×6 cm cathode. The combined current collector comprises 100 µm thick stainless steel plate which serves as a cathode current collector and a conductive film coated thereon.

The anode is a 50 µm thick zinc foil. An AGM glass fiber is used as separator. The size of the anode and separator is the same as the cathode.

The electrolyte is a water solution containing 2 mol/L zinc sulfate and 1 mol/L lithium sulfate.

The cathode, the separator and the anode are stacked and loaded into a case. The case is injected with the electrolyte and sealed. Then a battery is formed.

EXAMPLE f2

In example f2, the median size d50 of graphite is 8.0 µm, and the particle size d10 of graphite is 3 µm. The other part of battery is the same as example f1.

EXAMPLE f3

In example f3, the median size d50 of graphite is 18.6 µm, and the particle size d10 of graphite is 5 µm. The other part of battery is the same as example f1.

EXAMPLE f4

In example f4, the median size d50 of graphite is 36.1 µm; the particle size d10 of graphite is 10 µm. The other part of battery is the same as example f1.

COMPARATIVE EXAMPLE fc1

A cathode homogeneous slurry is prepared by dissolving 90.5 wt % $LiMn_2O_4$ as the cathode active material, 6% carbon black (Super-P) as conductive agent, 2.5% SBR and 1% CMC as binder in water. The median size d50 of Super-P is 0.2 µm. The cathode slurry is coated evenly on both sides of a combined current collector to form an active material layer, and then pressed and cut to a size 6 cm×6 cm cathode. The combined current collector comprises 100 µm thick stainless steel plate which serves as a cathode current collector and a conductive film coated thereon.

The other part of battery is the same as example f1.

EXAMPLE f5

In example f5, the electrolyte is a water solution containing 2 mol/L zinc methanesulfonate and 3 mol/L lithium methanesulfonate. The other part of battery is the same as example f1.

EXAMPLE f6

In example f6, the electrolyte is a water solution containing 2 mol/L zinc methanesulfonate and 3 mol/L lithium methanesulfonate. The other part of battery is the same as example f2.

EXAMPLE f7

In example f7, the electrolyte is a water solution containing 2 mol/L zinc methanesulfonate and 3 mol/L lithium methanesulfonate. The other part of battery is the same as example f3.

EXAMPLE f8

In example f8, the electrolyte is a water solution containing 2 mol/L zinc methanesulfonate and 3 mol/L lithium methanesulfonate. The other part of battery is the same as example f4.

COMPARATIVE EXAMPLE fc2

In comparative example fc2, the electrolyte is a water solution containing 2 mol/L zinc methanesulfonate and 3 mol/L lithium methanesulfonate. The other part of battery is the same as example fc1.

Gas Production Testing

The batteries are fully charged and the cathodes are taken out and placed in syringes respectively. The syringes are added with electrolyte and sealed. The amount of gas production per day is tested. The test results are shown in Table 9 for the gas production at 60° C.

As can be seen from Table 9, when the electrolyte of the battery is sulfate, the gas production of cathode containing conductive agent graphite has been significantly suppressed. The gas production amount fell from 10 ml to 4-5 ml at the first day; the accumulative gas production amount of six days fell from 25 ml to 5-7 ml. This result indicates that the conductive agent of cathode provides a good stability and corrosion resistance.

Additionally when the electrolyte of the battery is methanesulfonate, the gas production of cathode containing conductive agent graphite has been significantly suppressed. The gas production amount fell from 4.5 ml to 3-4 ml at the first day; the accumulative gas production amount of six days fell from 7.3 ml to 4-5 ml. This result further indicates that the conductive agent has a good stability and corrosion resistance. Meanwhile the combination of conductive agent graphite and methanesulfonate could further suppress gas production of cathode, which can be seen from that the amount of gas production of cathode in comparative example fc2 is less than that in comparative example fc1.

TABLE 9

| Cathode | D50 of graphite/μm | Electrolyte | Gas production amount at 60° C./ml Day 1st | Day 6th |
|---|---|---|---|---|
| Example f1 | 3.4 | Sulfate | 5 | 7 |
| Example f2 | 8.0 | | 4 | 6 |
| Example f3 | 18.6 | | 4 | 5 |
| Example f4 | 36.1 | | 4 | 5 |
| Comparative example fc1 | 0.2 | | 10 | 25 |
| Example f5 | 3.4 | Methanesulfonate | 4 | 6 |
| Example f6 | 8.0 | | 4 | 5 |
| Example f7 | 18.6 | | 3 | 4 |
| Example f8 | 36.1 | | 3 | 4 |
| Comparative example fc2 | 0.2 | | 4.5 | 7.3 |

Self-Discharge Testing

The batteries provided in Example f1-f8 and comparative fc1-fc2 are fully charged, laid up at 60° C. for one day or at room temperature (RT) for 28 days. The remaining battery capacity is tested. The test results are shown in Table 10. Table 10 shows the capacity retention of battery after laying up at 60° C. for one day or at room temperature for 28 days.

TABLE 10

| Battery | Electrolyte | Capacity Retention/% 60° C. | RT |
|---|---|---|---|
| Example f1 | Sulfate | 89 | 85 |
| Example f2 | | 91 | 87 |
| Example f3 | | 93 | 89 |
| Example f4 | | 93 | 89 |
| Comparative example fc1 | | 68 | 77 |
| Example f5 | Methanesulfonate | 94 | 89 |
| Example f6 | | 97 | 91 |
| Example f7 | | 96 | 92 |
| Example f8 | | 96 | 92 |
| Comparative example fc2 | | 91 | 84 |

As can be seen from table 10, batteries containing conductive agent exhibit relatively high capacity retention, while, the battery containing methanesulfonate electrolyte has positive effect on improving the capacity retention.

EXAMPLE f9

A cathode homogeneous slurry is prepared by dissolving 86.5 wt % $LiMn_2O_4$ as the cathode active material, 10% graphite as conductive agent, 2.5% SBR and 1% CMC as binder in water. The median size d50 of graphite is 8.0 μm, and the particle size d10 of graphite is 3 μm. The cathode slurry is coated evenly on both sides of a combined current collector to form an active material layer, and then pressed and cut to a size 6 cm×6 cm cathode. The combined current collector comprises 100 μm thick stainless steel plate which serves as a cathode current collector and a conductive film coated thereon.

The anode active material is a 50 μm thick zinc foil. The anode current collector is a 20 μm thick brass foil. Zinc foil and brass foil are stacked to form the anode.

An AGM glass fiber is used as separator. The size of the anode and separator is the same as the cathode.

The electrolyte is a water solution containing 2 mol/L zinc sulfate and 1 mol/L lithium sulfate.

The cathode, the separator and the anode are stacked and loaded into a case. The case is injected with the electrolyte and sealed. Then a battery is formed.

EXAMPLE f10

In example f10, a cathode homogeneous slurry is prepared by dissolving 84.5 wt % $LiMn_2O_4$ as the cathode active material, 12% graphite as conductive agent, 2.5% SBR and 1% CMC as binder in water. The other part of cathode and battery are the same as example f9.

Self-Discharge Testing

Batteries provided by example f9 and f10 are charged with constant current of 0.2 C to 2.1V, then charged with constant voltage until the current is reduced from 0.2 C to 0.02 C. the batteries are placed at 60° C. for one day and cooled. The capacity loss of batteries is tested.

The capacity loss of battery in example f9 is 12% after being placed at 60° C. for one day and the capacity loss of battery in example f10 is 13%, the result indicates that the increasing of graphite content in cathode slurry may slightly increase self-discharge of battery.

Float Charge Testing

Batteries provided by example f9 and f10 are charged with a 0.2 C rate to 2.0V at room temperature and batteries capacity are calibrated. Then the batteries are float charged for 168 hours and discharged with a 0.2 C rate to 1.4V. The discharge capacities of batteries are test. The discharge capacity decreasing to 50% of the calibration capacity is defined as float charge life.

The float charge life of batteries in example f9 and f10 are 2 weeks and 4 weeks respectively, which shows that the increasing of graphite content in cathode slurry may has slight side effect on self-discharge of battery, but could doubled float charge life of battery.

EXAMPLE r1

A homogeneous slurry is prepared by dissolving 90 wt % $LiMn_2O_4$ as the cathode active material, 5% Super-P as conductive agent, 2.5% SBR and 2.5% CMC as binder in water. The solid content of water is 60-70%. A nylon net is fully immersed into the slurry, taken out and dried at 60° C. to form a cathode plate with an active material layer. Then the cathode plate is cut to size 6 cm×6 cm. The thickness of the cathode plate is 0.4 mm and the density of the cathode active material is 750 $g/m^2$.

The conductive film is a composite with polyethylene and conductive carbon black. The thickness of the conductive film is 50 μm.

The cathode current collector is a 50 μm thick punching carbon steel.

A combined current collector is formed by hot pressing method. Specifically the cathode current collector is placed in the middle of two conductive films. The size of the conductive film is slightly larger than the cathode current collector. The conductive film and cathode current collector are combined together at 115-140° C. through air pressure machine with pressure of 0.5 MPa, and the exceeding parts of the conductive film beyond the punching carbon steel is well sealed.

The combined current collector is placed in the middle of two cathode plates. Repeat above steps to prepare the cathode. The pressing time of the air pressure machine is 10 seconds.

The anode is a 50 µm thick zinc foil. An AGM glass fiber is used as separator. The size of the anode and separator is the same as the cathode.

The electrolyte is a water solution containing 2 mol/L zinc sulfate and 1 mol/L lithium sulfate.

The cathode, the separator and the anode are stacked and loaded into a case. The case is injected with the electrolyte and sealed. Then a battery is formed. The battery is stood for 3 hours and then charged and discharged.

Charge and Discharge Testing

The battery is charged and discharged with a 0.2 C constant current. The voltage range of charge and discharge is 1.4-2.1V.

EXAMPLE r2

In example r2, the thickness of the conductive film is 100 µm. The other part of battery is the same as example r1.

EXAMPLE rc1

In example rc1, the cathode is prepared not by hot pressed but physically stacked of cathode plate, conductive film and cathode current collector. The other part of battery is the same as example r1.

Figure 19:
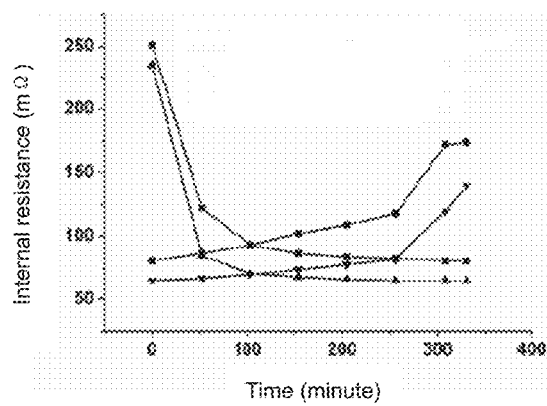
FIG. 19 is an internal resistance-charge and discharge time curve of batteries in example r1 and rc1.

FIG. 19 is an internal resistance-time curve during charging and discharging of batteries in example r1 and rc1. In FIG. 1 —■— represents charging process of the battery in comparative example rc1; —●— represents discharging process of the battery in comparative example rc1; —▲— represents charging process of the battery in example r1; —▼— represents discharging process of the battery in c example r1.

As can be seen from FIG. 19, the curve plateau of internal resistance of battery in example r1 is lower than that of battery in comparative example rc1. Meanwhile with the increase of charge and discharge cycles of battery, there is no change of the internal resistance of battery in example r1, but the internal resistance of battery in comparative example rc1 is gradually increasing. The results show that the cathode prepared by hot pressing method has low internal resistance, which could enables that the battery with the cathode has an excellent and stable cycle performance. In addition, the performance of battery in example r2 is better than that in example r1, which indicates that the conductive film thickness has a certain influence on the battery performance; battery with a 100 µm thick conductive film has a better cycle performance.

EXAMPLE r3

A homogeneous slurry is prepared by dissolving 90 wt % LiMn$_2$O$_4$ as the cathode active material, 5% Super-P as conductive agent, 2.5% SBR and 2.5% CMC as binder in water. The solid content of water is 60-70%. A nylon net is fully immersed into the slurry, taken out and dried at 60° C. to form a cathode plate with an active material layer. Then the cathode plate is cut to size 8 cm×10 cm. The thickness of the cathode plate is 0.4 mm and the density of the cathode active material is 750 g/m$^2$.

The cathode current collector is a 50 µm thick punching carbon steel. The cathode plate and the cathode current collector with the same size are stacked to form the cathode. The method of preparing the cathode is defined as separate manufacturing method.

The anode is a 50 µm thick zinc foil. An AGM glass fiber is used as separator. The size of the anode and separator is the same as the cathode.

The electrolyte is a water solution containing 2 mol/L zinc sulfate and 1 mol/L lithium sulfate. The pH of the electrolyte is adjusted to 4.

Five cathodes and six anodes are staggered and loaded into a case. Cathode and anode is separated with the separator. The case is injected with 170 ml electrolyte and sealed. Then a battery is formed. The battery is stood for 3 hours and then charged and discharged with a 0.2 C rate. The voltage range is 1.4-2.1V.

EXAMPLE rc2

In example rc2, the cathode is prepared by directly coating the slurry on the cathode current collector, drying and cutting to a desired size. The other part of battery is the same as example r3. The method of preparing the cathode is defined as slurry method.

Figure 20:
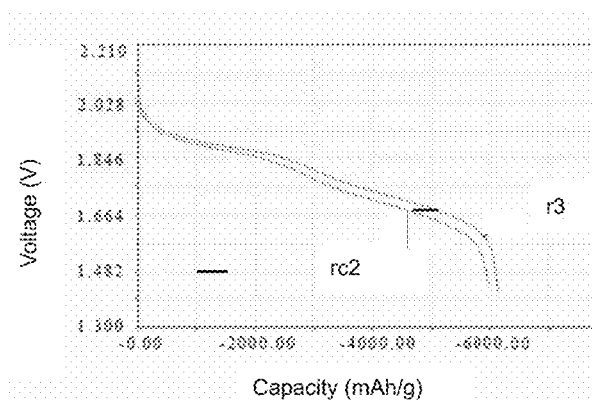
FIG. 20 is a voltage-discharge capacity curve of batteries in example r3 and rc2.

FIG. 20 is a voltage-discharge capacity curve of batteries in example r3 and comparative example rc2. As can be seen from FIG. 20, the discharge capacity of battery in example r3 is higher than that of battery in Comparative example rc2. The results show that the battery containing a cathode plate which is separately prepared has a higher discharge capacity comparing to the battery containing a cathode which is prepared by coating the cathode active material directly on the cathode current collector.

Table 11 shows the capacity of five batches cathode plates respectively prepared by the methods provided by example r3 and rc2. As can be seen from table 11, the capacity tolerance (difference between the maximum capacity and the minimum capacity) of cathode plates prepared by the methods provided by example r3 is smaller and the cathode plates has an excellent capacity consistency, which indicates that the cathode plate has a very significant effect on improving battery consistency.

TABLE 11

| Cathode plate batch (Theoretical capacity 1200 mAh) | Capacity/mAh separate manufacturing method | Capacity/mAh Slurry Method |
|---|---|---|
| 1 | 1211 | 1253 |
| 2 | 1205 | 1239 |
| 3 | 1203 | 1104 |
| 4 | 1194 | 1191 |
| 5 | 1199 | 1189 |
| Capacity Tolerance | ±17 mAh | ±149 mAh |

EXAMPLE r4

A homogeneous slurry is prepared by dissolving 86.5 wt % LiMn$_2$O$_4$ as the cathode active material, 10% graphite as conductive agent, 2.5% SBR and 1% CMC as binder in water. A nylon net is fully immersed into the slurry, taken out the nylon net containing the slurry and dried at 60° C. to form a cathode plate with an active material layer. Then the cathode plate is cut to size 6 cm×6 cm. The thickness of the cathode plate is 0.4 mm and the density of the cathode active material is 750 g/m$^2$.

The conductive film is a composite with polyethylene and conductive carbon black. The thickness of the conductive film is 100 µm.

The cathode current collector is a 50 µm thick punching carbon steel.

A combined current collector is formed by hot pressing method. Specifically the cathode current collector is placed in the middle of two conductive films. The size of the conductive film is slightly larger than the cathode current collector. The conductive film and cathode current collector are combined together at 115-140° C. through air pressure machine with pressure of 0.5 MPa, and the exceeding parts of the conductive film beyond the punching carbon steel is well sealed.

The prepared combined current collector and the cathode plate are folded together. Repeat above steps to prepare the cathode. The pressing time of the air pressure machine is 10 seconds.

The anode includes an anode current collector and an anode active material. The anode current collector is a 10 μm thick brass foil and the anode active material is a 50 μm thick zinc foil.

The electrolyte is a water solution containing 2 mol/L zinc methanesulfonate and 3 mol/L lithium methanesulfonate. The pH of the electrolyte is adjusted to 3.5.

An AGM glass fiber is used as separator. The size of the anode and separator is the same as the cathode.

The cathode, the separator and the anode are stacked and loaded into a case. The case is injected with the electrolyte and sealed. Then a battery is formed. The battery is stood for a while and then charged and discharged.

Charge and Discharge Testing

The battery is charged and discharged with a 0.2 C rate. The charge and discharge voltage range is 1.4-2.1V.

Figure 21:
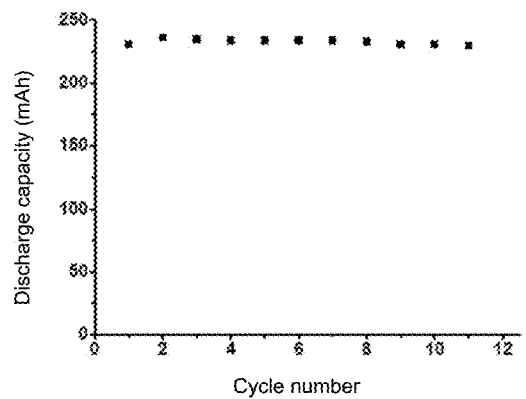
FIG. 21 is a cycles-discharge capacity curve of batteries in example r4.

FIG. 21 is a cycles-discharge capacity curve of batteries in example r4. As can be seen from FIG. 21, the battery has stable cycle performance.

EXAMPLE r5

A homogeneous slurry is prepared by dissolving 86.5 wt % $LiMn_2O_4$ as the cathode active material, 10% graphite as conductive agent, 2.5% SBR and 1% CMC as binder in water. A nylon net is fully immersed into the slurry, taken out the nylon net containing the slurry and dried at 60° C. to form a cathode plate with an active material layer. Then the cathode plate is cut to size 8 cm×10 cm. The thickness of the cathode plate is 0.4 mm and the density of the cathode active material is 750 g/m$^2$.

The conductive film is a composite with polyethylene and conductive carbon black. The thickness of the conductive film is 100 μm.

The cathode current collector is a 50 μm thick punching carbon steel.

A combined current collector is formed by hot pressing method. Specifically the cathode current collector is placed in the middle of two conductive films. The size of the conductive film is slightly larger than the cathode current collector. The conductive film and cathode current collector are combined together at 115-140° C. through air pressure machine with pressure of 0.5 MPa, and the exceeding parts of the conductive film beyond the punching carbon steel is well sealed.

The prepared combined current collector is placed in the middle of two cathode plates and stacked together.

The anode includes an anode current collector and an anode active material. The anode current collector is a 10 μm thick brass foil and the anode active material is a 50 μm thick zinc foil. Zinc foil is placed in the middle of two brass foil and stacked together.

An AGM glass fiber is used as separator. The size of the anode and separator is the same as the cathode.

The electrolyte is a water solution containing 2 mol/L zinc sulfate and 1 mol/L lithium sulfate. The pH of the electrolyte is adjusted to 3.5.

Six cathodes and seven anodes are staggered and loaded into a case. Cathode and anode is separated with the separator. The case is injected with 170 ml electrolyte and sealed. Then a battery with a theoretical capacity 6 Ah is formed. The battery is stood for 3 hours and then tested. The battery is charged with a 0.2 C constant current and with a 2.05V or 2.1V constant voltage, discharged with a 0.2 C constant current. The voltage range is 1.4-2.1V.

Figure 22:
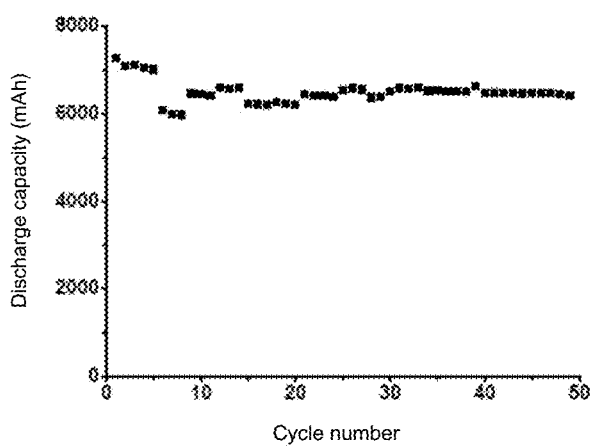
FIG. 22 is a cycles-discharge capacity curve of batteries in example r5.

FIG. 22 is a cycles-discharge capacity curve of batteries in example r5. As can be seen from FIG. 22, the discharge capacity of the battery is very stable; the discharge capacity of the battery is nearly 6 Ah after 40 cycles with no loss, which indicates the battery has a stable cycle performance.

Aspects of the present invention are described above by means of various illustrative examples. The examples contained herein are not intended to limit the invention in any way but to illustrate same in more detail. It should be understood that the experiments in the following examples, unless otherwise indicated, are in accordance with conditions as would be known to persons skilled in the art or the conditions recommended by manufacturers.

The invention claimed is:

1. A cathode material for a battery, comprising:
a cathode active material which is capable of reversibly intercalating-deintercalating a plurality of first metal ions and a conductive agent graphite; wherein the particle size of the conductive agent graphite is less than 50 μm and the crystallinity of the conductive agent graphite is no less than 90%,
wherein the conductive agent graphite comprises a first graphite and a second graphite, the particle size of the first graphite is 15-50 μm and the particle size of the second graphite is 5 to 15 μm.

2. The cathode material according to claim 1, wherein the weight percentage range of the first graphite and the second graphite in the conductive agent graphite are 30-50% and 40-60% respectively.

3. The cathode material according to claim 1, wherein the particle size d10 of conductive agent graphite is 6 μm.

4. The cathode material according to claim 1, wherein the particle size of conductive agent graphite is greater than 0.5 μm.

5. The cathode material according to claim 1, wherein the weight percentage range of the conductive agent graphite in the cathode material is 6-15%.

6. A battery comprising a cathode, an anode and an electrolyte, wherein the cathode comprises a cathode active material which is capable of reversibly intercalating and deintercalating a plurality of first metal ions; and a conductive agent graphite; wherein the particle size of the conductive agent graphite is less than 50 μm and the crystallinity of the conductive agent graphite is no less than 90%,
wherein the electrolyte comprises at least a solvent capable of dissolving solute, the solute being ionized to a plurality of second metal ions that can be reduced to a metallic state during a charge cycle and be oxidized from the metallic state to the second metal ions during a discharge cycle and the plurality of first metal ions that can deintercalate from the cathode active material during the charge cycle and intercalate into the cathode active material during the discharge cycle, and wherein the plurality of second metal ions are selected from the group consisting of manganese ions, iron ions, copper ions, zinc ions, chromium ions, nickel ions, tin ions and lead ions.

7. The battery according to claim 6, wherein the anions of the electrolyte are selected from the group consisting of sulfate ions, chloride ions, acetate ions, nitrate ions and alkyl sulfonate ions.

8. The battery according to claim 7, wherein the alkyl sulfonate ions are methyl sulfonate ions.

9. The battery according to claim 7, wherein the concentration of the alkyl sulfonate ions in the electrolyte is 0.5~12 mol/L.

10. The battery according to claim 6, wherein the plurality of first metal ions are selected from the group consisting of Li ions, Na ions, Mg ions and Zn ions.

11. A battery pack comprising a number of batteries according to claim 6.

12. An uninterruptible power supply comprising a number of batteries according to claim 6.

13. A vehicle comprising a number of batteries according to claim 6 being configured as power supply of driven engine.

14. A cathode material for a battery, comprising:
a cathode active material which is capable of reversibly intercalating-deintercalating a plurality of first metal ions and a conductive agent graphite; wherein the particle size of the conductive agent graphite is less than 50 μm and the crystallinity of the conductive agent graphite is no less than 90% and wherein the particle size d10 of conductive agent graphite is 6 μm.

* * * * *